(12) United States Patent
Momotsu

(10) Patent No.: US 9,423,571 B2
(45) Date of Patent: Aug. 23, 2016

(54) OPTICAL CONNECTOR PROTECTING CAP, OPTICAL FIBER CABLE WITH CONNECTOR CAP, AND CAP REMOVAL TOOL

(71) Applicant: FUJIKURA LTD., Koto-ku, Tokyo (JP)

(72) Inventor: Norihiro Momotsu, Sakura (JP)

(73) Assignee: FUJIKURA LTD., Tokyo (JP)

(*) Notice: Subject to any disclaimer, the term of this patent is extended or adjusted under 35 U.S.C. 154(b) by 11 days.

(21) Appl. No.: 13/727,047

(22) Filed: Dec. 26, 2012

(65) Prior Publication Data

US 2014/0178007 A1 Jun. 26, 2014

(51) Int. Cl.
G02B 6/38 (2006.01)
G02B 6/36 (2006.01)
G02B 6/43 (2006.01)
G02B 6/42 (2006.01)

(52) U.S. Cl.
CPC ............ *G02B 6/3849* (2013.01); *G02B 6/3879* (2013.01); *G02B 6/36* (2013.01); *G02B 6/3616* (2013.01); *G02B 6/3807* (2013.01); *G02B 6/3825* (2013.01); *G02B 6/3893* (2013.01); *G02B 6/4292* (2013.01); *G02B 6/43* (2013.01)

(58) Field of Classification Search
CPC .......... G02B 6/36; G02B 6/4292; G02B 6/43; G02B 6/3807; G02B 6/3849; G02B 6/3825; G02B 6/3893; G02B 6/3616
See application file for complete search history.

(56) References Cited

U.S. PATENT DOCUMENTS

| 5,452,390 | A | * | 9/1995 | Bechtel et al. ................... 385/92 |
| 5,797,298 | A | * | 8/1998 | Grevel ...................... B25B 9/02 439/148 |
| 7,903,922 | B2 | * | 3/2011 | Momotsu et al. ............. 385/135 |
| 2008/0107381 | A1 | * | 5/2008 | Nishioka et al. ................ 385/60 |
| 2010/0034505 | A1 | * | 2/2010 | Momotsu ............. G02B 6/3897 385/135 |
| 2010/0202736 | A1 | * | 8/2010 | Roth ............................... 385/59 |
| 2011/0255829 | A1 | * | 10/2011 | Anderson et al. ............... 385/60 |
| 2011/0262077 | A1 | * | 10/2011 | Anderson et al. ............... 385/78 |
| 2012/0033922 | A1 | * | 2/2012 | Nakagawa ........... G02B 6/3879 358/78 |

FOREIGN PATENT DOCUMENTS

| JP | 9-297244 A | 11/1997 |
| JP | 10-206689 A | 8/1998 |
| JP | 2001-201664 A | 7/2001 |
| JP | 2001-290046 A | 10/2001 |
| JP | 2003-232959 A | 8/2003 |
| WO | 2009/110421 A1 | 9/2009 |

OTHER PUBLICATIONS

Japanese Office Action for Japanese Application No. 2011-177561 dated May 21, 2013.
IEC International Standard, "Fibre optic interconnecting devices and passive components—Fibre optic connector interfaces", IEC 61754-7, Mar. 2008, 32 pages, Edition 3.0.

* cited by examiner

*Primary Examiner* — Eric Wong
*Assistant Examiner* — Mary A El Shammaa
(74) *Attorney, Agent, or Firm* — Sughrue Mion, PLLC

(57) ABSTRACT

An optical connector protecting cap includes a projecting pulling piece to which a drawing out force is applied to pull out a cap from an optical connector, the projecting pulling piece protruding from a front end wall that covers in one end in an axis line of a cylindrical body placed on the outside of the optical connector.

15 Claims, 17 Drawing Sheets

OPTICAL CONNECTOR PROTECTING CAP, OPTICAL FIBER CABLE WITH CONNECTOR CAP, AND CAP REMOVAL TOOL

BACKGROUND OF THE INVENTION

1. Field of the Invention

The present invention relates to an optical connector protecting cap fitted on the optical connector to protect an end surface of the optical connector; an optical fiber cable with a connector cap, in which the optical connector protecting cap is fitted on an optical connector provided on an optical fiber cable terminal; and a cap removal tool used for pulling out the optical connector protecting cap fitted on an optical connector from the optical connector.

The contents of Japanese Patent Application No. 2011-177561, filed Aug. 15, 2011 are incorporated herein by reference.

2. Description of the Related Art

In an optical connector, a detachable and attachable cap is fitted on the outside of the tip of the optical connector to protect an end surface (apical surface) of the optical connector (see for example, Japanese Unexamined Patent Application, First Publication No. 2001-290046). By fitting the cap on the outside of the tip of the optical connector, the cap covers the end surface of the optical connector, and protect the apical surface of the optical fiber, which is exposed to the end surface of the optical connector, from scratches, dust and the like. This technique can be applied to optical connectors not only for single cores, but also for multicores (see for example, Japanese Unexamined Patent Application, First Publication No. H10-206689). However, this technique requires a space around a cap fitted on the outside of the tip of an optical connector to pull the cap out from the optical connector, thus a plurality of optical connectors cannot be aligned with high density.

For example, as described in Japanese Unexamined Patent Application, First Publication No. 2001-201664, a plug component (the "cap" described in Japanese Unexamined Patent Application, First Publication No. 2001-201664) which can be inserted into and pulled out from a connector insertion hole of an optical connector adaptor is used as another technique to protect an end surface of the optical connector. In this technique, an opening at one end in the axis line of the connector insertion hole, which perforates an optical connector adaptor, is filled with the plug component inserted into the connector insertion hole, and thereby an end surface (apical surface) of an optical connector, which is inserted and fitted into the connector insertion hole from the other end in the axis line of the connector insertion hole, is protected from scratches, dust and the like. However, this technique requires optical connector adaptors, and therefore when an optical connector is not inserted into an optical connector adaptor, the technique cannot be applied to protect an end surface of such the optical connector.

SUMMARY OF THE INVENTION

The present invention has been completed in the light of the above circumstances, and an object of the present invention is to provide an optical connector protecting cap, an optical fiber cable with a connector cap, and a cap removal tool. By utilizing these, a cap fitted on the outside of the tip of an optical connector can be easily pulled out from the optical connector, and also a plurality of optical connectors can be aligned with high density.

To solve the problems described above, the present invention provides the following components.

The first aspect of the present invention provides an optical connector protecting cap, in which a projecting pulling piece protrudes from a front end wall that covers in one end in the axis line of a cylindrical body that is placed on the outside of the optical connector, toward the opposite direction of the cylindrical body.

The second aspect provides the optical connector protecting cap according to the first aspect, in which the projecting pulling piece has a claw on the tip of an extended portion that is extended from the front end wall.

The third aspect provides the optical connector protecting cap according to the first or the second aspects, in which the front end wall has a thin-walled portion at a central part thereof, the thin-walled portion is formed to be thin-walled to enhance a light transmission rate, and the projecting pulling piece protrudes from the front end wall so as to avoid the thin-walled portion.

The fourth aspect provides an optical fiber cable with a connector cap, in which an optical connector protecting cap is fitted on an optical connector that is assembled on optical fibers on an optical fiber cable terminal, and in the optical connector protecting cap, a projecting pulling piece protrudes from a front end wall that covers in one end in the axis line of a cylindrical body that is placed on the outside of the optical connector, toward the opposite direction of the cylindrical body.

The fifth aspect provides the optical fiber cable with a connector cap according to the fourth aspect further including a cap removal tool provided with a removal tool body that is engaged to a locking part, which is formed on the projecting pulling piece of the optical connector protecting cap, from a side of the front end wall.

The sixth aspect provides the optical fiber cable with a connector cap according to the fifth aspect, in which the projecting pulling piece of the optical connector protecting cap has a claw as the locking part on the tip of an extended portion extended from the front end wall, and the body of the cap removal tool is formed to be perforated with a projecting piece insertion hole that is interpolated with the extended portion of the projecting pulling piece of the optical connector protecting cap, and to be engaged to the claw from the side of the front end wall.

The seventh aspect provides the optical fiber cable with a connector cap according to the sixth aspect, in which a plurality of the projecting piece insertion holes are formed to be aligned in the body of the cap removal tool.

The eighth aspect provides the optical fiber cable with a connector cap according to the sixth or seventh aspect, in which the projecting pulling piece of the optical connector protecting cap protrudes from a position shifted from an outer circumference to a central side of the front end wall, and the body of the cap removal tool is retained by the locking part of the projecting pulling piece of the optical connector protecting cap and the outer circumference of the front end wall, thereby the body of the cap removal tool is located between the locking part and the front end wall.

The ninth aspect provides the optical fiber cable with a connector cap according to any one of the fifth to eighth aspects, in which the cap removal tool has a handle portion protruded from the body of the removal tool.

The tenth aspect provides the optical fiber cable with a connector cap according to any one of the fourth to ninth aspects, further includes a collectively-holding unit collectively-holding a plurality of the optical connectors in an aligned manner.

The eleventh aspect provides the optical fiber cable with a connector cap according to the tenth aspect, in which each of the both ends of the optical fiber cable has an optical connector alignment unit, an the plurality of the optical connectors are aligned and collectively held by using the collectively-holding unit.

The twelfth aspect provides a cap removal tool having a body of the cap removal tool, wherein a projecting pulling piece protrudes from a front end wall of an optical connector protecting cap, one end of the optical connector in an axis line of a cylindrical body, which is placed on the outside of an optical connector is covered with the front end wall, and the body of the cap removal tool is engaged to a locking part formed on the projecting pulling piece from the side of the front end wall, so that a drawing out force to pull out the optical connector protecting cap from the optical connector is applied to the projecting pulling piece.

The thirteenth aspect provides the cap removal tool according to the twelfth aspect, in which the projecting pulling piece of the optical connector protecting cap has a claw as the locking part on the tip of an extended portion extended from the front end wall, and the body of the removal tool is formed to be perforated with a projecting piece insertion hole that is interpolated with the extended portion of the projecting pulling piece of the optical connector protecting cap, and to be engaged to the claw from the side of the front end wall.

The fourteenth aspect provides the cap removal tool according to the thirteenth invention, in which a plurality of the projecting piece insertion holes are formed to be aligned in the body of the removal tool.

The fifteenth aspect provides the cap removal tool according to the thirteenth or fourteenth aspects, in which a projecting pulling piece of the optical connector protecting cap protrudes from a position shifted from an outer circumference to a central side of the front end wall, and the body of the removal tool is retained by the locking part of the projecting pulling piece of the optical connector protecting cap and the outer circumference of the front end wall, thereby the body of the removal tool is formed to be located between the locking part and the front end wall.

The sixteenth aspect provides the cap removal tool according to any one of the thirteenth to fifteenth aspects, which has a handle portion protruded from the body of the removal tool.

In the present invention, an optical connector protecting cap that is fitted on an optical connector can be easily pulled out from the optical connector, by applying a drawing out force (pulling out force) to a projecting pulling piece protruded from the optical connector protecting cap. In the optical connector protecting cap, a projecting pulling piece protrudes from a front end wall, which covers in one end in the axis line of a cylindrical body that is placed on the outside of the optical connector, toward the opposite direction of the cylindrical body not to disturb a high-density alignment of a plurality of optical connectors, so that optical connectors can be aligned with high density.

DETAILED DESCRIPTION OF THE PREFERRED EMBODIMENTS

Hereinafter, one embodiment of the present invention will be explained by reference to the figures.

Figure 1:
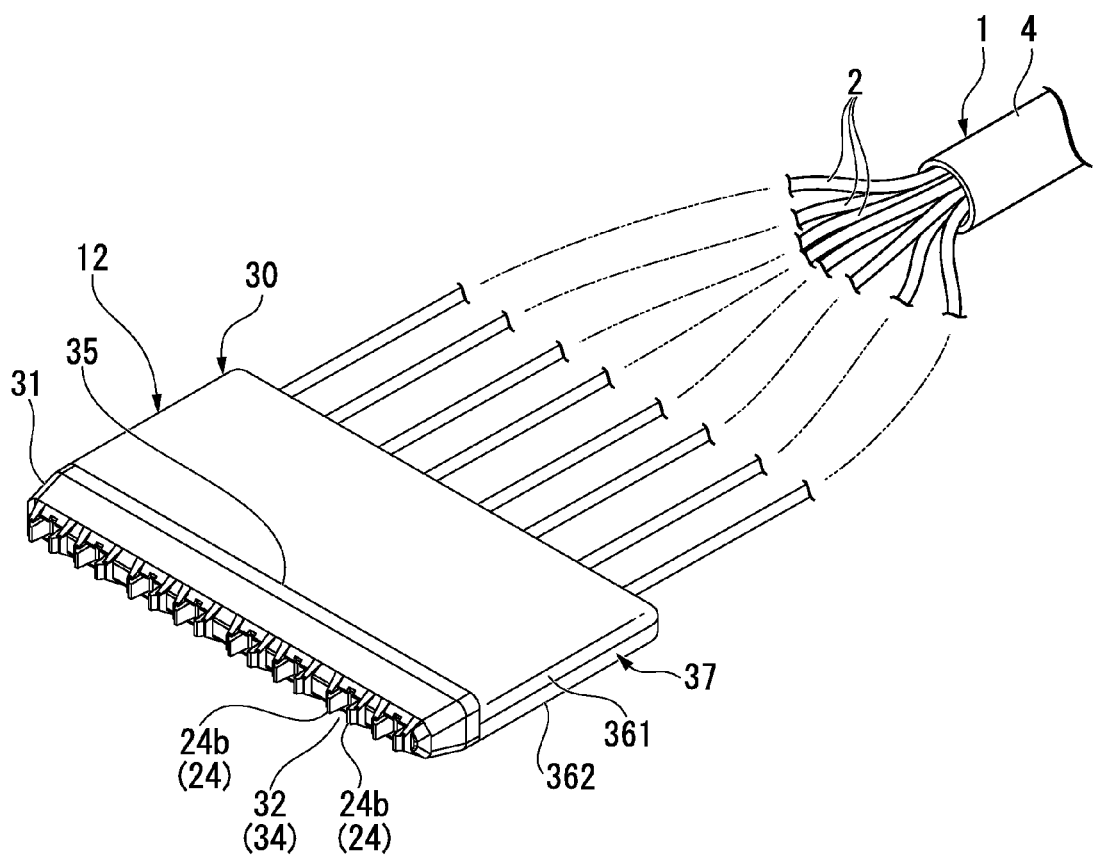
FIG. 1 is a perspective view showing one example of a unit with a cap removal tool, which is assembled on a terminal of an optical fiber cable with a connector cap according to one embodiment of the present invention.
Figure 2:
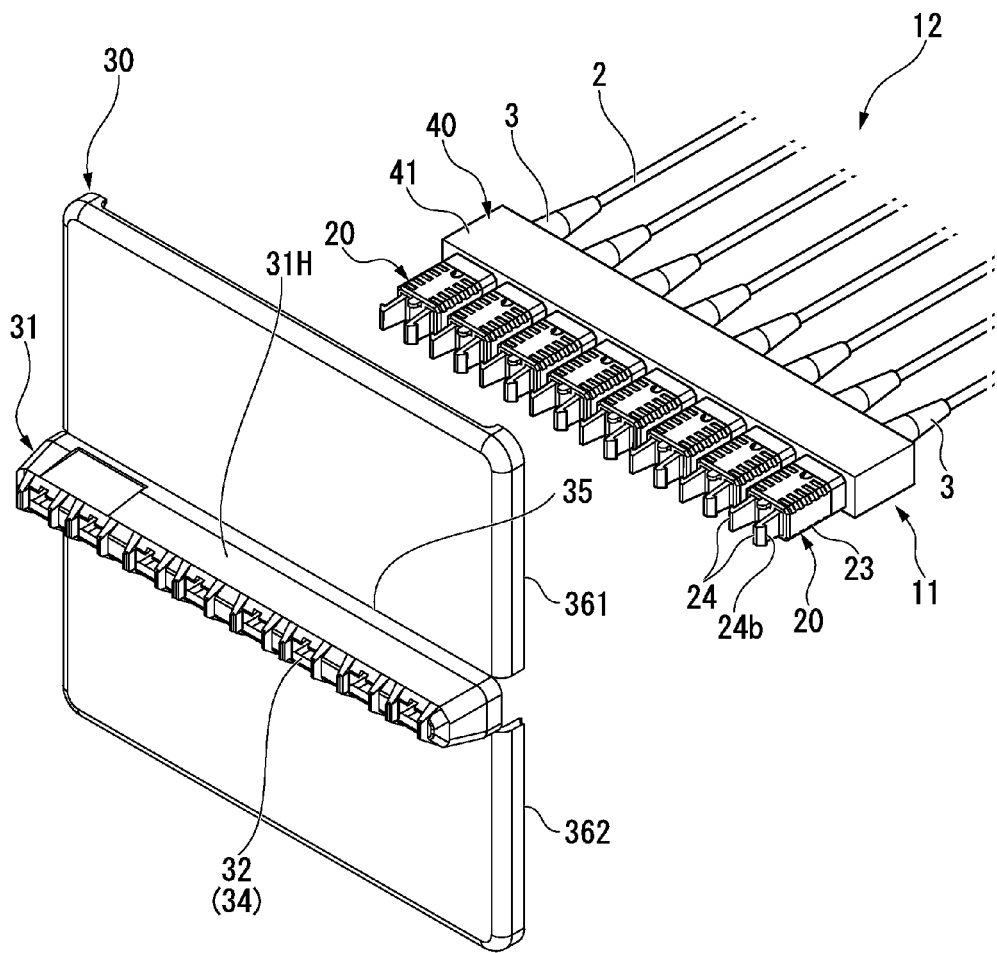
FIG. 2 is an exploded perspective view illustrating the unit with a cap removal tool of FIG. 1.
Figure 3:
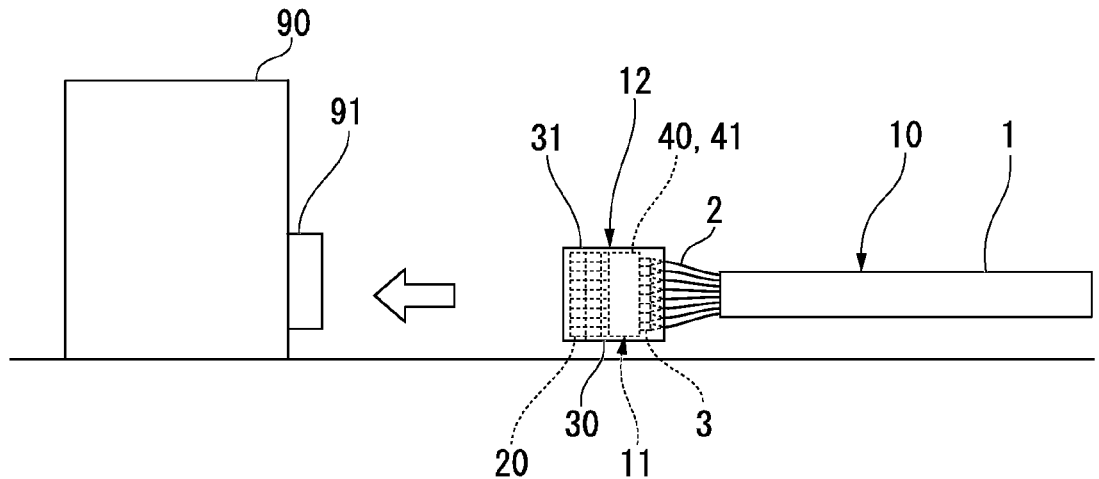
FIG. 3 illustrates how to pull a terminal of an optical fiber cable with a connector cap according to one embodiment of the present invention into an optical connector adaptor that is attached to a device.

FIGS. 1-3 show one example of an optical fiber cable with a connector cap of an embodiment according to the present invention.

As shown in FIGS. 1-3, an optical fiber cable with a connector cap 10 exemplified herein has the optical connector alignment unit 11 (see FIG. 3), in which a plurality of optical connectors 3 provided on the tips of the optical fibers 2, which are exposed to the terminal of the multicore optical fiber cable 1, are assembled and aligned. The optical fiber cable with a connector cap 10 is composed by assembling the unit with a cap removal tool 12, in which the optical connector protecting cap 20 (hereinafter, also referred to as the cap) is fitted on each of the optical connectors 3 in the optical connector alignment unit 11 to cover the tips of the optical connectors 3, and the cap removal tool 30 to which each of the caps 20 is engaged is provided.

Hereinafter, the optical fiber cable with a connector cap 10 is also referred to as a cable with caps. The cable with caps 10 is composed by assembling the unit with a cap removal tool 12 on the optical fiber cable 1.

As shown in FIG. 3, the optical connector alignment unit 11 has a structure, in which a plurality of the optical connectors 3 are aligned in line by using the collectively-holding unit 40, which can hold a plurality of the optical connectors 3.

Figure 4:
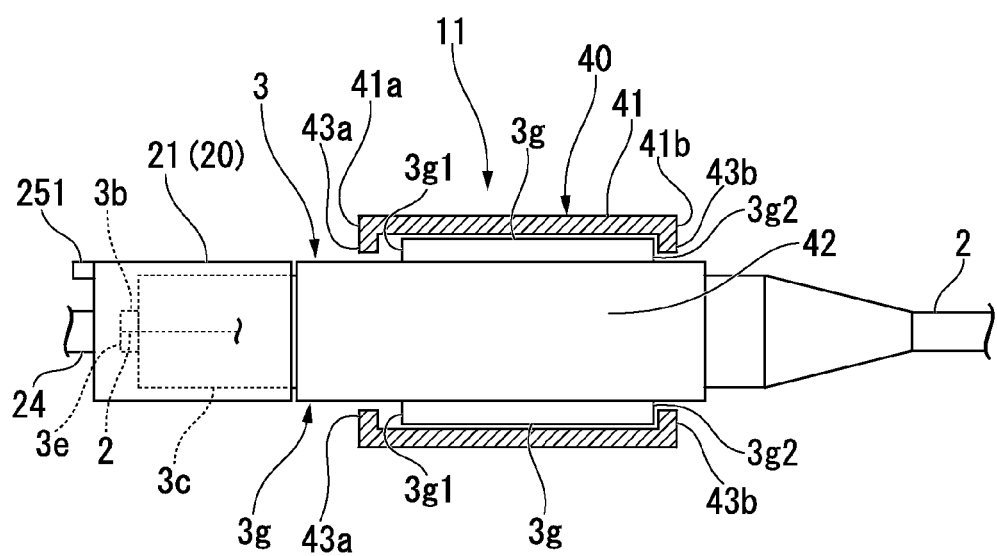
FIG. 4 is a cross-sectional view illustrating a relationship between an optical connector of the unit with a cap removal tool of FIG. 1 and a collectively-holding unit.
Figure 5A:
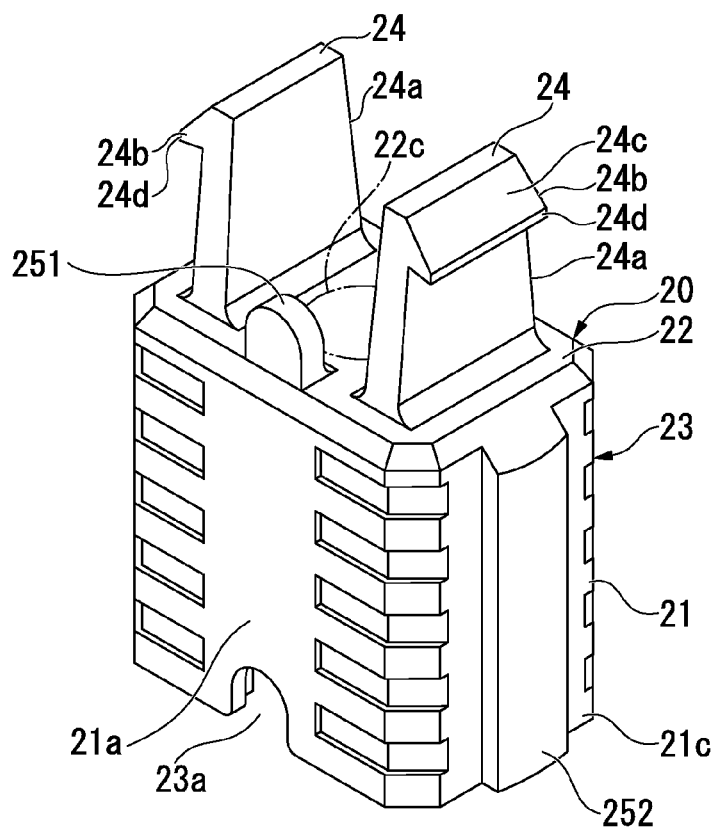
FIG. 5A is a perspective view illustrating the cap of the unit with a cap removal tool of FIG. 1.
Figure 5B:
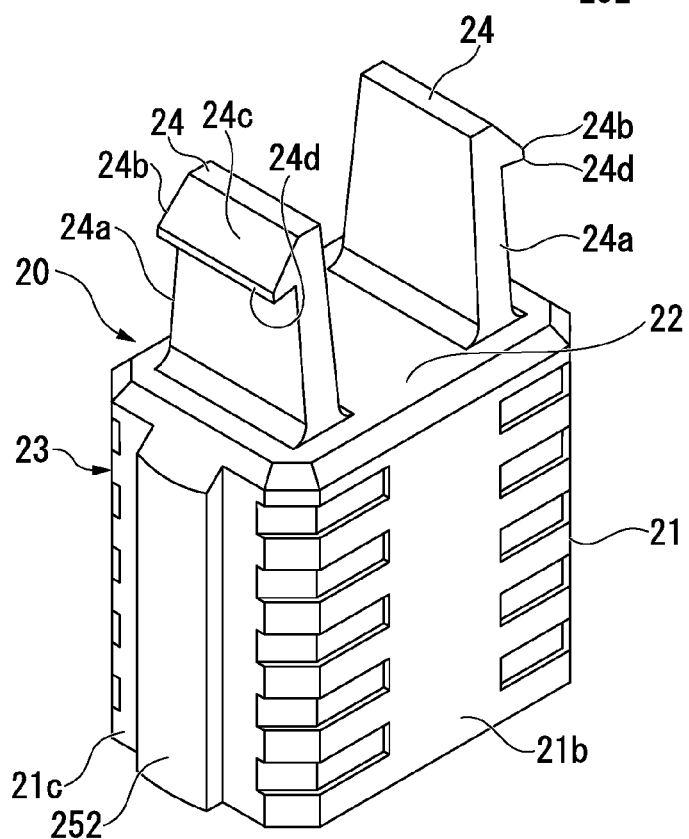
FIG. 5B is a perspective view illustrating the cap of the unit with a cap removal tool of FIG. 1.

As shown in FIG. 4, FIG. 5A, and FIG. 5B, in the collectively-holding unit 40, the optical connector accommodating holes 42 are formed in multiple places along longitudinal direction of the holding unit body 41, which looks like a slender plate. The optical connector accommodating holes 42 perforate the holding unit body 41 in its front-back direction to which the longitudinal direction and the depthwise direction cross at right angles. The optical connector accommodating holes 42 are opened to both the front and back end surfaces (the front end surface 41a and the back end surface 41b) of the holding unit body 41.

In the cable with caps 10 shown in the figures, specifically, optical connector 3 is an MPO optical connector (F13 optical connectors defined by JIS C5982, or optical connectors defined by IEC 61754-7. MPO: Multi-fiber Push On).

As shown in FIG. 5B, the collectively-holding unit 40 accommodates central parts in the front-back direction of the optical connectors 3, which are MPO optical connectors, into the optical connector accommodating holes 42, and the central part in the front-back direction of the optical connector 3 has the coupling 3a (lug). Regarding the optical connector 3, the front end side including the coupling 3a and the ferrule 3b and the rear end side opposite to the front end side protrude from each of the front and rear sides of the collectively-holding unit 40.

The collectively-holding unit 40 has the front side protruded retaining wall 43a protruded from the front end portion inner circumference of the optical connector accommodating hole 42 and the rear side protruded retaining wall 43b protruded from the rear end portion inner circumference of the optical connector accommodating hole 42. The front side protruded retaining wall 43a and the rear side protruded retaining wall 43b are formed on each of a plurality of the optical connector accommodating holes 42 in the collectively-holding unit 40.

The coupling 3a of the optical connector 3 is located between the protruded retaining walls 43a and 43b, in which 43a is on the front side, and 43b is on the rear side in the front-back direction of the collectively-holding unit 40. The coupling 3a has a sleeve like shape and has a contacting protrusion 3g, which protrudes to the outer surface side of a portion located between both ends in the axis line of the coupling 3a. The contacting protrusion 3g is extended along the axis line of the coupling 3a. In the contacting protrusion 3g of the coupling 3a, the front end surface 3g1 can contact the rear side of the front side protruded retaining wall 43a, and the rear end surface 3g2 can contact the front side of the rear side protruded retaining wall 43b. Accordingly, the coupling 3a of the optical connector 3 is controlled for its slipping off from the optical connector accommodating hole 42, by the front and rear protruded retaining walls 43a and 43b.

In the collectively-holding unit 40, the front-back direction of the optical connector 3 can be held along with that of the holding unit body 41, by holding the coupling 3a of the optical connector 3 between protruded retaining walls 43a and 43b, which are located respectively on the front and the rear side of the optical connector accommodating hole 42.

The optical connector accommodating holes 42 in the collectively-holding unit 40 are formed in multiple sites in the longitudinal direction of the holding unit body 41, and are formed in line, so that the central axis line of each of the holes is parallel to the front-back direction of the holding unit body 41.

A plurality of the optical connectors 3 in the optical connector alignment unit 11 are held in the collectively-holding unit 40, such that the front end portion of each of the optical connectors 3 protrude from the front side of the holding unit body 41 in the collectively-holding unit 40, and rear end portion of each of the optical connectors 3 protrudes from the rear side of the holding unit body 41 in the collectively-holding unit 40.

The structure of the collectively-holding unit is not particularly limited, as long as it can collectively hold a plurality of the optical connectors 3 without falling apart, while keeping their front-back directions parallel. As the collectively-holding unit, for example, the one which grasps a portion behind the front end portion of the optical connector 3 by clamping force to hold it can be used.

The optical connectors are not limited to the MPO type, but a variety of optical connectors including those for multicores or single cores can be used as long as those can be held by the collectively-holding unit.

In the cable with caps 10 shown in the figures, specifically, the optical fiber cable 1 is a cord cable, in which an optical fiber cord is used as the optical fiber 2, and a plurality of the optical fiber cords are collectively covered by the coat 4. As the optical fiber cords, both single core cords and multicore cords can be used. As the optical connectors 3, optical connectors for multicores, such as MPO optical connectors are assembled on the tip of the multicore optical fiber cords.

An example of the multicore optical fiber cord has a structure, in which a ribbon is interpolated in a reinforced tube. However, the multicore optical fiber cord is not limited to the structures in which optical fiber ribbons are used, and for example, structures in which a plurality of single core optical fiber cores or optical fiber element wires are interpolated in reinforced tubes can also be used.

The optical fiber 2 is not limited to optical fiber cords, and for example, optical fibers with coverings, such as optical fiber cores and optical fiber element wires, i.e., optical fibers with coverings not having external protective materials such as protective tubes, which cover the optical fibers with coverings, can also be used. In the optical fiber with a covering, a peripheral surface (lateral face) of a bare optical fiber is covered by a covering.

An example of the bare optical fiber is a fused silica optical fiber. An example of the covering is a resin covering, such as ultraviolet-curable resin, polyamide resin and the like.

The cable with caps 10 is composed of the optical fiber cables with connectors, in which the optical connector 3 is provided (assembled) on each of the tips of a plurality of optical fibers 2 (in the figures, eight optical fibers) that are exposed on (extended from) the terminal of the optical fiber cable 1.

The optical connectors 3, each of which is provided (assembled) on the tip of each of the optical fibers 2 that are exposed on (extended from) the terminal of the optical fiber cable 1, are collectively held in the collectively-holding unit 40 and aligned.

Each of the optical connectors 3 is accommodated in each of the optical connector accommodating holes 42 in the collectively-holding unit 40.

The number of optical connector accommodating holes 42 in the collectively-holding unit 40 is greater than or equal to the number of the optical connectors 3 on the tips of the optical fibers 2 that are exposed on the terminal of the optical fiber cable 1. The caps 20 are fitted on the tips of the optical connectors 3 protruded from the collectively-holding unit 40.

The cap 20 will be explained in below.

As shown in FIGS. 5A, 5B, 6A, and 6B, the cap 20 is basically composed of the bottomed cylindrical cap body 23, in which one end in the axis line of the cylindrical body 21 that is placed on the outside of the optical connector 3 is filled by the front end wall 22, and a pair of the elastic engaging pieces 24 protruded from the front end wall 22 toward the direction opposite to a side of the inner surface that is inside of the cap body 23. In the cylindrical body 21, the rear end side opposite to the front end wall 22 is an open end. In an inner space of the cap body 23, one end in the axis line of the cylindrical body 21 (the tip side of the cap) is filled by the front end wall 22, and whole cross section of the opposite rear end side, which is vertical to the axis line of the cylindrical body 21, is opened to the inside of the rear end side of the cylindrical body 21.

Note that when the cap body 23 is explained, the axis line of the cylindrical body 21 means the axis line of the cap body 23.

As shown in FIG. 5B, the cap 20 can be fitted on the optical connector 3 detachably and attachably, by fitting the cap body 23 to the outside of the plug frame 3c of the optical connector 3, which is an MPO optical connector, from the tip side of the optical connector 3. When the cap 20 is fitted on the optical connector 3, the cap 20 accommodates the tip of the plug frame 3c and the ferrule 3b that protrudes from the tip of the plug frame 3c, inside of the cap body 23.

The cap 20 shown in the figures is integrally formed with plastics.

Figure 6A:
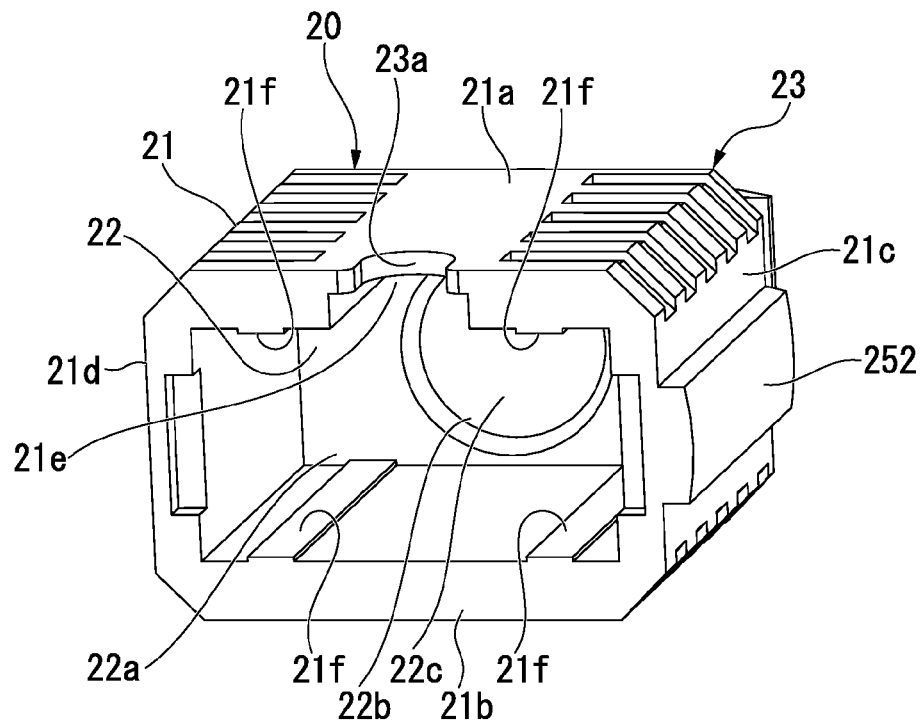
FIG. 6A is a rear end perspective view illustrating the cap of the unit with a cap removal tool of FIG. 1.
Figure 6B:
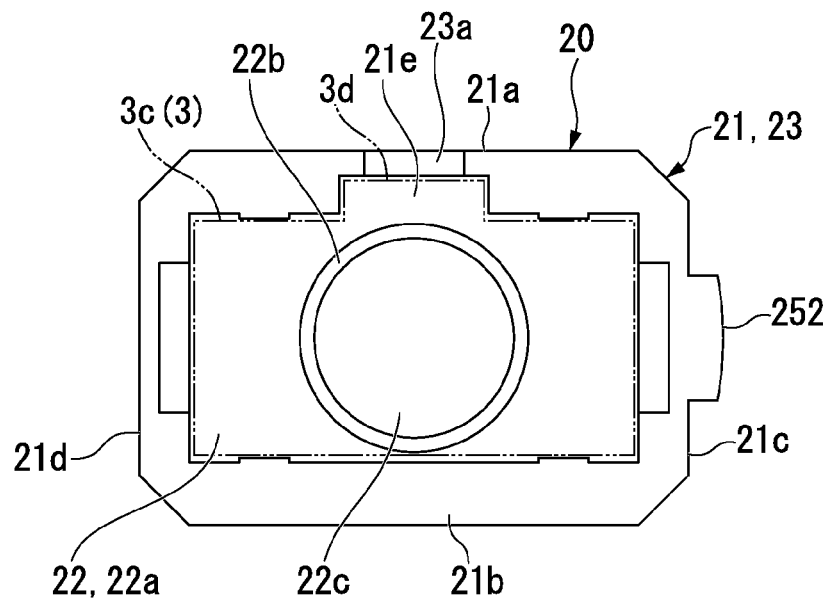
FIG. 6B is a rear view (a view from the rear end) illustrating the cap of the unit with a cap removal tool of FIG. 1.

As shown in FIGS. 6A and 6B, the cylindrical body 21 of the cap 20 is formed as a square tube shape. The structure of the cylindrical body 21 is a square tube shape, in which a pair of the face plates 21a and 21b (the first face plate 21a and the second face plate 21b) provided in parallel with each other are linked through a pair of the lateral plate 21c and 21d (the first lateral plate 21c and the second lateral plate 21d), which are vertical to the face plates 21a and 21b. The separation between a pair of the face plates 21a and 21b is shorter than that between a pair of the lateral plates 21c and 21d. The cap body 23 is formed as a square tube shape whose cross section is slender, and in the cylindrical body 21, the length of the vertical direction which is a distance direction of a pair of the face plates 21a and 21b which are separated from each other is shorter than the length of the horizontal direction which is a distance direction of a pair of the lateral plates 21c and 21d which are separated from each other.

The shape and length of the cross sectional inner circumference of the cylindrical body 21, which is vertical to the axis line of the cylindrical body 21, is almost identical to the shape and length of the cross sectional outer circumference of the sleeve like plug frame 3c of the optical connector 3, which is vertical to the axis line of the sleeve-like plug frame 3c.

The cap 20 can be placed on the outside of the tip of the optical connector 3, by accommodating the key 3d, which protrudes to outer circumference of the plug frame 3c of the optical connector 3 and is extended in the front-back direction of the optical connector, into the key groove 21e, which is extended to the inner surface of the cylindrical body 21 along the axis line of the cylindrical body 21. More particularly, the key groove 21e is formed on a side of the inner surface of the face plate 21a of the cap body 23.

As also shown in FIGS. 6A and 6B, the spacing protrusions 21f are protruded to the sides of the inner surface of the face plates 21a and 21b of the cap body 23, and when the cap body 23 is placed on the outside of the plug frame 3c of the optical connector 3, the spacing protrusions 21f contact with the plug frame 3c, and minimal clearance is kept between the face plate 21a and the plug frame 3c, and between the face plate 21b and the plug frame 3c. The spacing protrusions 21f are provided to keep aeration by the clearances, so that the optical connector 3 is smoothly inserted to, and pulled out from the cap body 23. The spacing protrusions 21f have prominent shapes, and are extended on the face plate 21a and 21b, along the axis line of the cap body 23.

Note that the spacing protrusions 21f are protruded from the face plates 21a and 21b with a minimal width, such as 0.05-0.15 mm. In the cap 20, by minimizing the protruded length of the spacing protrusions 21f from the face plates 21a and 21b, inside of the cap body 23 can be fully protected from dust.

Caps not having the spacing protrusions 21f can also be used.

Instead of the spacing protrusion 21f, grooves extended on the inner surface of the cap body 23 along the axis line of the cap body 23 can be formed on the cap, so that clearances for aeration are kept between the inner surface of the cap body 23 and the optical connector inserted therein.

As shown in FIGS. 5A and 5B, a pair of the elastic engaging pieces 24 protrudes from the both horizontal ends of the front end wall 22, as separated each other from the central part of the front end wall 22. Note that each of the elastic engaging pieces 24 protrudes from the both ends in the horizontal direction of the front end wall 22, where shifted from the edges to the central part.

In the elastic engaging piece 24, the claw 24b protrudes from the tip of the extended portion 24a, which is extended from the front end wall 22. The claw 24b protrudes from the tip of the extended portion 24a, toward the direction opposite to the other one of a pair of the elastic engaging pieces 24, in which each of a pair of the elastic engaging pieces 24 face each other.

Figure 9:
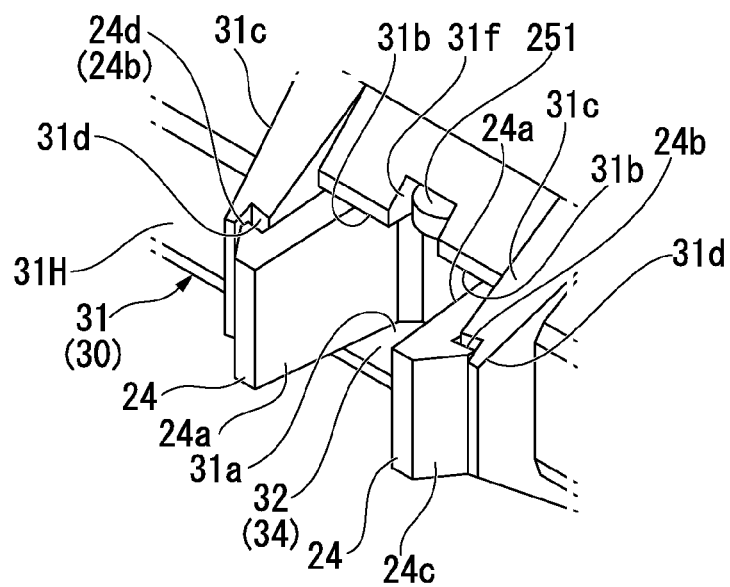
FIG. 9 is a partially enlarged perspective view illustrating a relationship between a cap removal tool of the unit with a cap removal tool of FIG. 1 and a cap.

As shown in FIGS. 1, 2, and 9, the cap removal tool 30 has the removal tool body 31 in which the perforated cap holes 34 are formed. The perforated cap hole 34 is composed of the cap body accommodating hole 33, which accommodates the cap body 23 of the cap 20, and the engaging piece insertion hole 32 (projecting piece insertion hole), which communicates with the cap body accommodating hole 33. The elastic engaging pieces 24 of the cap 20 can be inserted into the engaging piece insertion hole 32.

Figure 8:
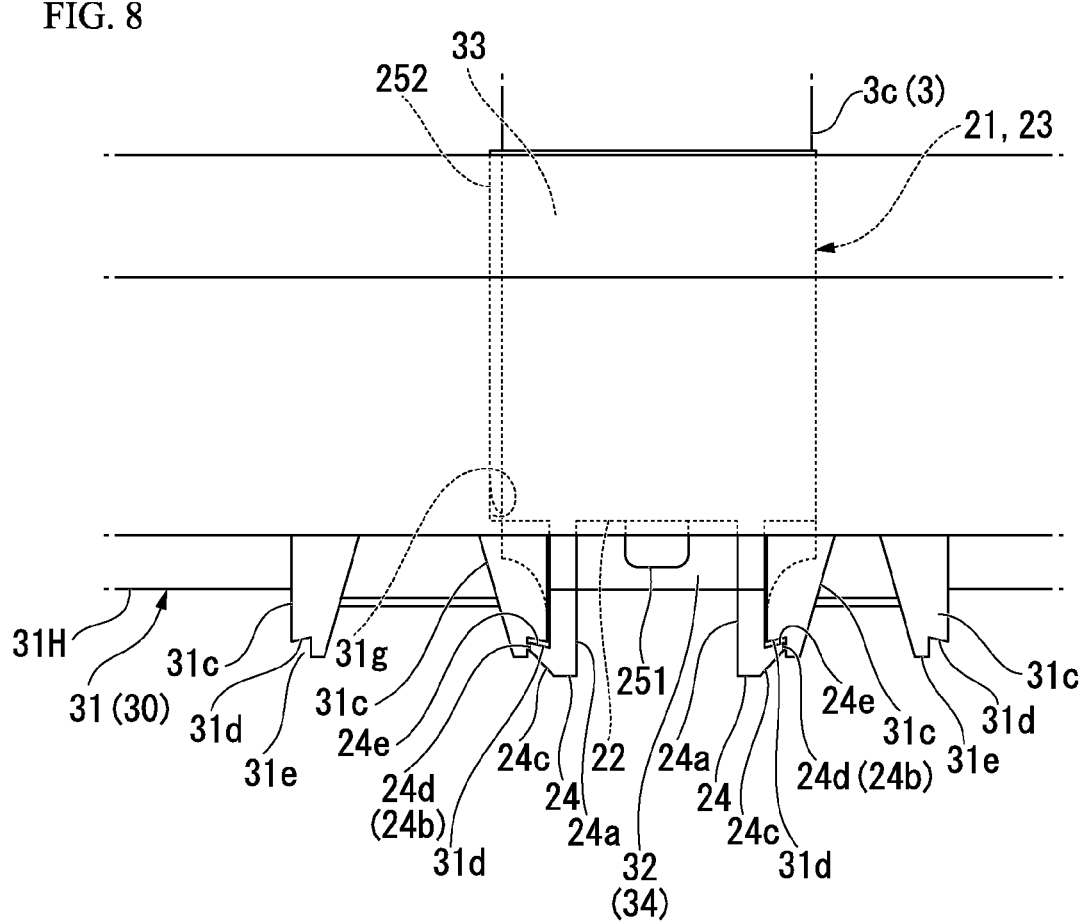
FIG. 8 is a partially enlarged plan view illustrating a relationship between a cap removal tool of the unit with a cap removal tool of FIG. 1 and a cap.

As shown in FIGS. 1 and 2, the removal tool body 31 of the cap removal tool 30 shown in the figures has the housing part 31H whose shape is slender. As shown in FIGS. 10-15, the perforated cap holes 34 are formed on a plurality of sites in the housing part 31H, along its longitudinal direction. The perforated cap hole 34 penetrates the removal tool body 31 in the axis line vertical to the longitudinal direction of the housing part 31H. In the removal tool body 31, the axis lines of all of the perforated cap holes 34 in the housing part 31H are formed so as to be parallel each other. As shown in FIGS. 8 and 9, the engaging piece insertion hole 32 of each of the perforated cap holes 34 is opened to the front end of the housing part 31H, which is opposite to the rear end of the housing part 31H, where the cap body accommodating holes 33 of all of the perforated cap holes 34 are opened to.

Figure 10:
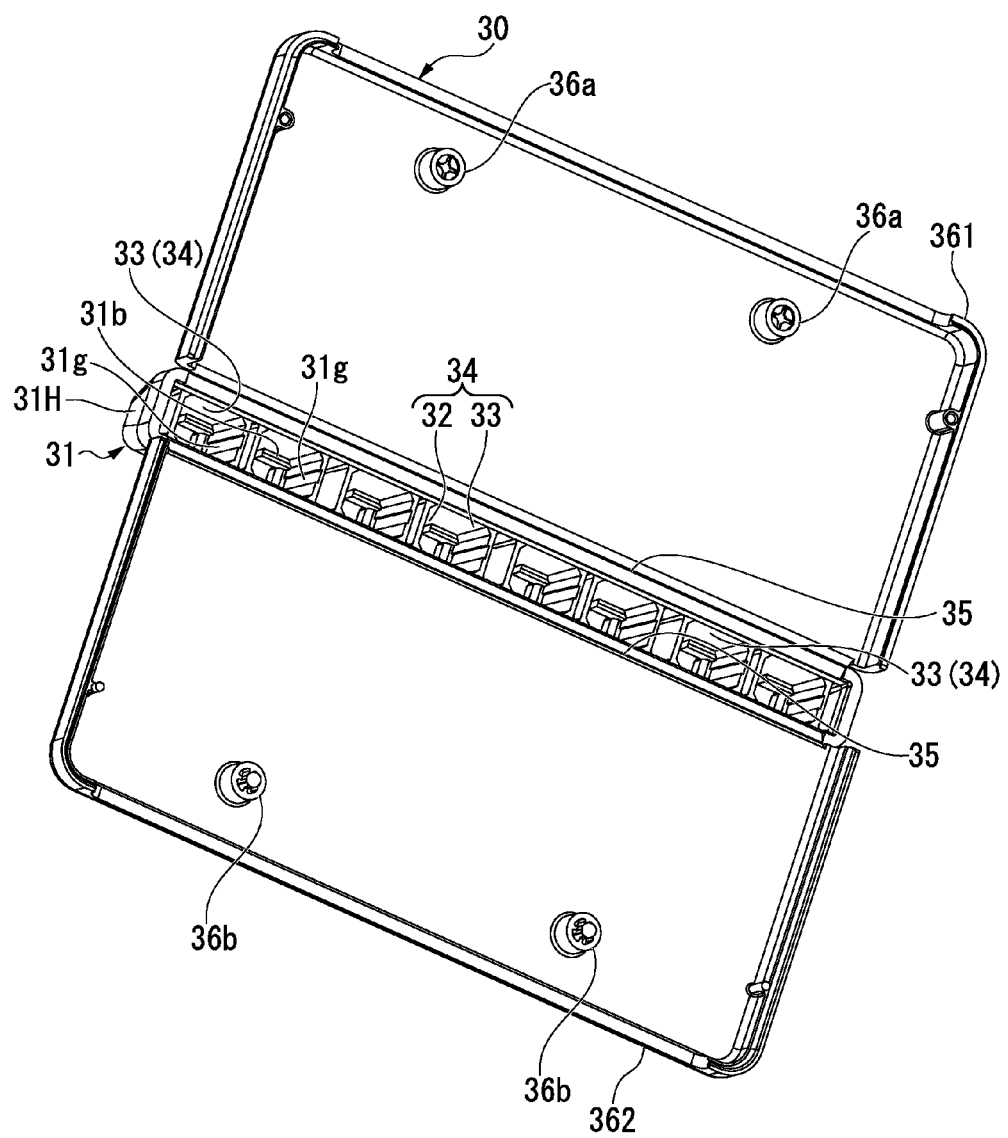
FIG. 10 is a perspective view illustrating the cap removal tool of the unit with a cap removal tool of FIG. 1.
Figure 11:
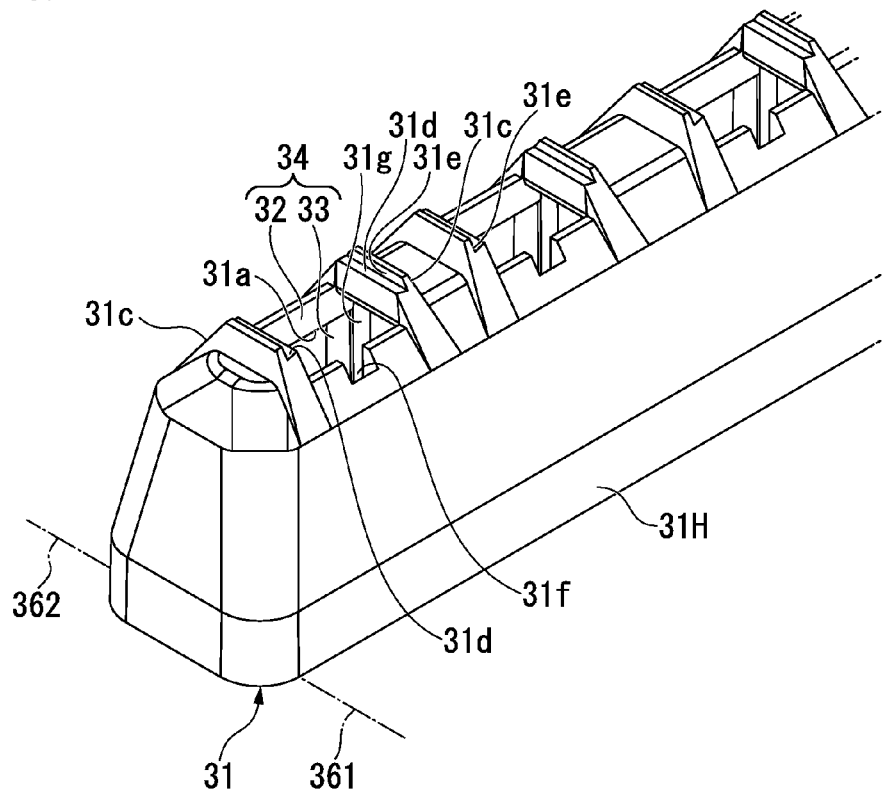
FIG. 11 is a partially enlarged perspective view illustrating a body structure of the cap removal tool of FIG. 10.
Figure 12:
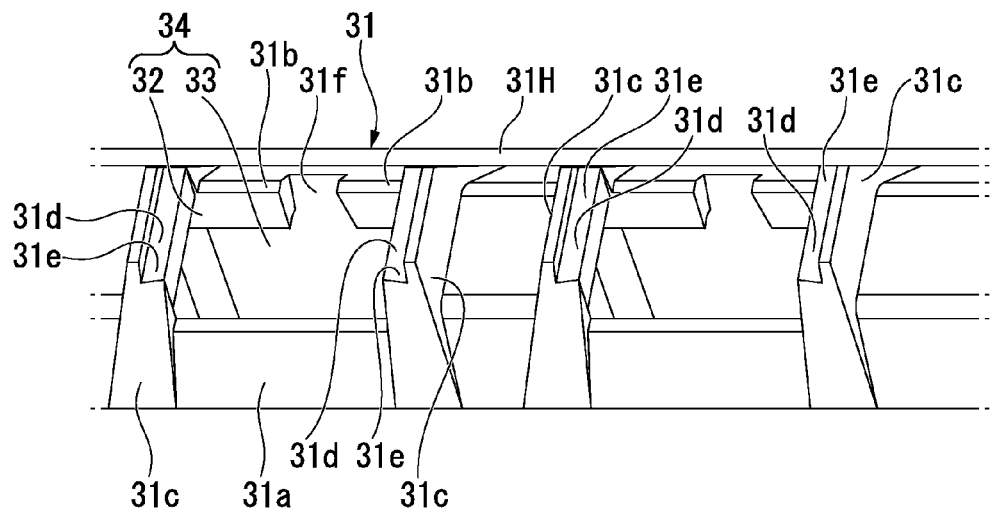
FIG. 12 is a partially enlarged perspective view showing a structure of the cap removal tool of FIG. 10, viewed from a direction different from that of FIG. 11, which shows a body structure of the cap removal tool.

The cap removal tool 30 shown in the FIGS. 1, 2, 10 and the like is integrally formed with plastics. As shown in FIGS. 2 and 10, the cap removal tool 30 has a pair of the cover plates, 361 and 362, which are located on both sides of the width direction of the rear end of the removal tool body 31 and the housing part 31H of the removal tool body 31 and linked through the thin-walled portion 35. The width direction of the housing part 31H of the removal tool body 31 refers to the direction that is vertical to the longitudinal direction of the housing part 31H and is also vertical to the axis line of the perforated cap hole 34.

The cover plates 361 and 362 can be rotated with respect to the housing part 31H of the removal tool body 31. They are rotated around the rotational axis line, which is along the longitudinal direction of the housing part 31H, with the thin-walled portion 35 as a hinge part.

As shown in FIG. 1, the cap removal tool 30 can hold the collectively-holding unit 40, which is located in the rear side of the removal tool body 31, by sandwiching collectively-holding unit 40 between a pair of the closed cover plates 361 and 362.

The unit with a cap removal tool 12 in the cable with caps 10 has a structure, in which the cap body 23 of the cap 20 fitted on the optical connector 3 is accommodated in the cap body accommodating hole 33 in the housing part 31H of the removal tool body 31, and the collectively-holding unit 40 holding the optical connector 3 is sandwiched between a pair of the cover plates 361 and 362.

Figure 13:
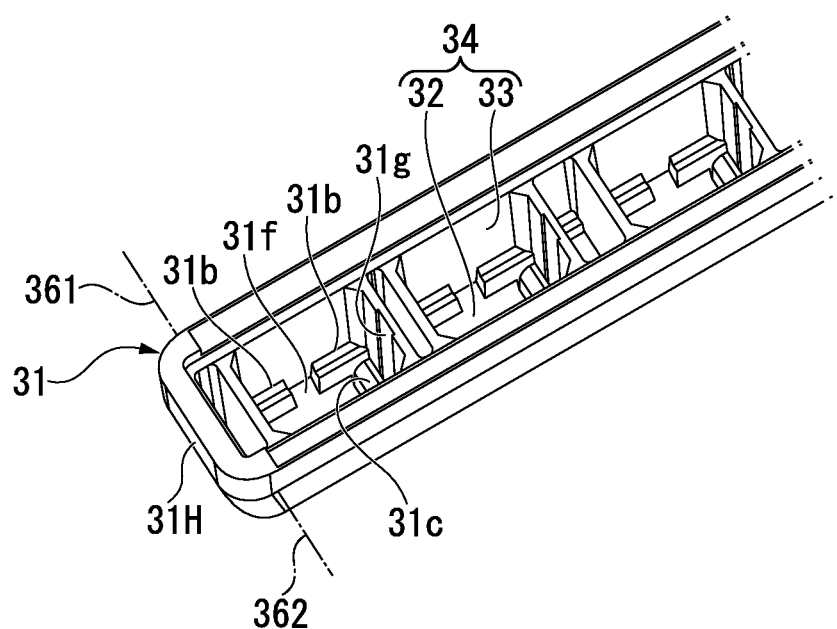
FIG. 13 is a partially enlarged perspective view showing a body structure of the cap removal tool of FIG. 10, viewed from rear end thereof.
Figure 14:
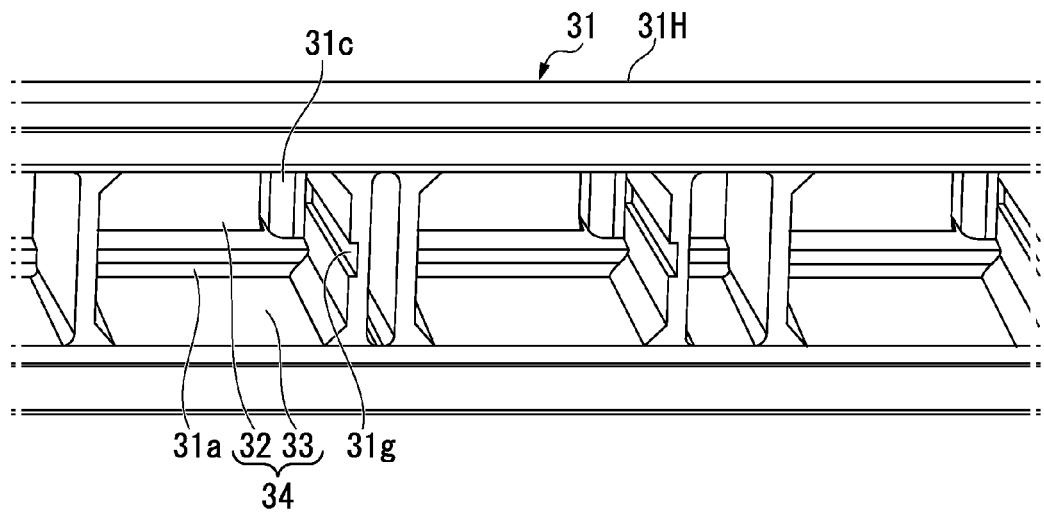
FIG. 14 is a partially enlarged perspective view showing a body structure of the cap removal tool of FIG. 10, viewed from a direction different from that of FIG. 13.
Figure 15:
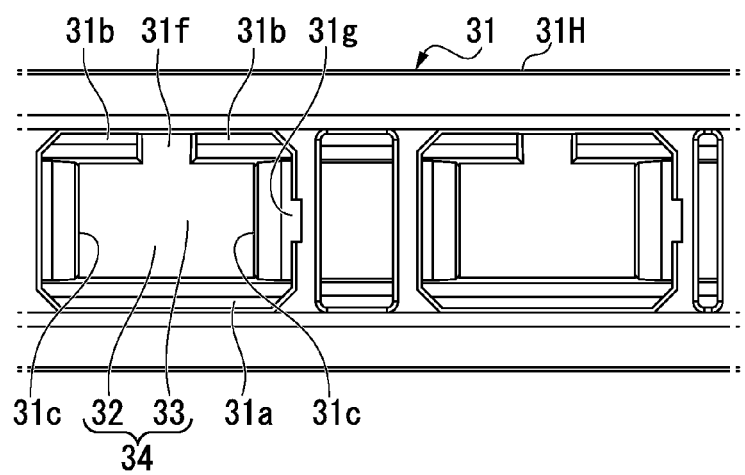
FIG. 15 is a partially enlarged rear view (a view from the rear end) of the body of the cap removal tool of FIG. 10.

As shown in FIGS. 13-15, the cap body accommodating hole 33 in the housing part 31H of the removal tool body 31 is formed in a square tube shape whose cross section is slender, which is almost identical to a cross sectional shape vertical to the axis line of the cap body 23. For the perforated cap hole 34 and the cap body accommodating hole 33, hereinafter, the cross sectional longitudinal direction of the cap body accommodating hole 33 is also referred to as the cross sectional horizontal direction, and the cross sectional short direction of the cap body accommodating hole 33 is also referred to as the cross sectional vertical direction.

The cap contacting protrusions 31a and 31b are protruded from the inner surface of both sides in the cross sectional short direction of the front end portion of the perforated cap hole 34, and the front end wall 22 on the front end of the cap body 23 of the cap 20, which is inserted into the cap body accommodating hole 33 from the rear side opening of the cap body accommodating hole 33, contacts with the cap contacting protrusions 31a and 31b. In the cap removal tool 30 shown in the figures, the cap contacting protrusions 31a and 31 b are extended on the inner surface of the front end portion of both sides in the cross sectional vertical direction of the perforated cap hole 34, along the cross sectional horizontal direction of the perforated cap hole 34.

The removal tool body 31 of the cap removal tool 30 shown in the figures, has the protruded engaging wall 31c, which protrudes from the inner surface of the front end portion of both sides in the cross sectional horizontal direction of the cap body accommodating hole 33 to protrude from the housing part 31H to the forward side.

As shown in FIGS. 8-15, specifically, the engaging piece insertion hole 32 is surrounded by the cap contacting protrusions 31a and 31b, which are located on both sides in the cross sectional vertical direction of the perforated cap hole 34, and the base ends of the protruded engaging walls 31c, which are located on both sides in the cross sectional horizontal direction of the perforated cap hole 34.

In the unit with a cap removal tool 12, the elastic engaging piece 24, which is extended from the cap body 23 that is accommodated into the cap body accommodating hole 33 in the housing part 31H of the removal tool body 31 of the cap removal tool 30, passes through the engaging piece insertion hole 32 in the removal tool body 31, and the claw 24b that is on the tip of the elastic engaging piece 24 is located in front of the removal tool body 31. The engaging surface 31d, which can be engaged to the claw 24b from the side of the cap body 23, is formed on the tip of the protruded engaging wall 31c of the removal tool body 31 of the cap removal tool 30. In the unit with a cap removal tool 12, the claws 24b on a pair of the elastic engaging pieces 24 of the cap 20 are located in front of the engaging surfaces 31d on a pair of the protruded engaging walls 31c, which protrude from both sides of the engaging piece insertion hole 32 where a pair of the elastic engaging pieces 24 pass through.

The claw 24b on the elastic engaging piece 24 of the cap 20 serves as a locking part, which locks the removal tool body 31 to prevent it from slipping off from the tip of the elastic engaging piece 24. Thus, the removal tool body 31 is attached to the cap 20 fitted on the optical connector 3, which is held in the collectively-holding unit 40, while slipping off of the removal tool body 31 from the elastic engaging piece 24 of the cap 20 is controlled.

An array pitch of the perforated cap holes 34 in the removal tool body 31 (particularly, the housing part 31H) is adjusted to an array pitch of the optical connector accommodating holes 42 in the collectively-holding unit 40. The removal tool body 31 is fitted on all of the caps 20, each of which is fitted on each of a plurality of the optical connector 3 that are held in the collectively-holding unit 40. In the unit with a cap removal tool 12, all of the caps 20 are collectively held in the removal tool body 31.

The unit with a cap removal tool 12 in the cable with caps 10 is assembled as follows: the optical connector alignment unit 11 is assembled by collectively holding a plurality of the optical connectors 3, which are provided on the tips of the optical fibers 2 exposed to the terminal of the optical fiber cable 1, in the collectively-holding unit 40; the optical connectors with caps are assembled by fitting the cap 20 on each of the tips of the optical connectors 3 in the optical connector alignment unit 11; and the elastic engaging piece 24 of each of the cap 20 is interpolated in the engaging piece insertion hole 32 in the removal tool body 31 to accommodate the cap body 23 in the cap body accommodating hole 33, by depressing the removal tool body 31 of the cap removal tool 30 from the tip side of the elastic engaging piece 24 of each of the cap 20 toward the cap body 23. Accordingly, the engaging surface 31d of the removal tool body 31 is located on the rear side of the claw 24b, which is on the tip of the elastic engaging piece 24 of each of the cap 20 (the rear side is the side of the cap body 23), and thereby the unit with a cap removal tool 12 is assembled.

Note that when depressing the removal tool body 31 of the cap removal tool 30 toward the cap body 23, the cover plates 361 and 362 are opened, and thereby contact of the cover plates 361 and 362 with the cap 20 is avoided.

As shown in FIG. 8 and the like, the sloping surface 24c, whose distance from the extended portion 24a increases as being close to the cap body 23 from the tip of the extended portion 24a of the elastic engaging piece 24, is formed on the claw 24b on the elastic engaging piece 24 of the cap 20. The sloping surface 24c is extended from the tip of the extended portion 24a to the apex 24d, in which the protruding length of the claw 24b from the extended portion 24a is the maximum. In addition, the locking surface 24e, which is a surface vertical to the axis line from the apex 24d to the cap body 23, or slightly sloped toward the tip side of the extended portion 24a (the latter is shown in the figures), is formed on the claw 24b.

In assembling of the unit with a cap removal tool 12, when the elastic engaging piece 24 is interpolated in the engaging piece insertion hole 32 by depressing the removal tool body 31 of the cap removal tool 30 from the tip side of the elastic engaging piece 24 of the cap 20 toward the cap body 23, a pair of the elastic engaging pieces 24 of the cap 20 are elastically deformed and approaches each other by the sloping surface 24c of the claw 24b is depressed by the base end of the protruded engaging wall 31c of the removal tool body 31, and thereby a pair of the elastic engaging pieces 24 are smoothly entered between the protruded engaging walls 31c on both sides of the perforated cap hole 34 in the removal tool body 31. When the removal tool body 31 moves toward the rear end of the cap body 23 (placed the removal tool body 31 on the outside of the cap body 23), the claws 24b on a pair of the elastic engaging pieces 24 of the cap 20 can be located in front of the housing part 31H, through the engaging piece insertion hole 32. The notched portions 31e are made by notching the tips of the protruded engaging walls 31c of both sides of the perforated cap hole 34 in the removal tool body 31, so that the notched portions face each other. As the removal tool body 31 moves toward the rear end of the cap body 23, the claws 24b on a pair of the elastic engaging pieces 24 of the cap 20 can be entered into the notched portions 31e by elasticity of the elastic engaging pieces 24.

As shown in FIG. 8 and the like, the engaging surface 31d of the protruded engaging wall 31c is a stepped surface located on the boundary between the notched portion 31e in the protruded engaging wall 31c and a portion near the side of the base end of the protruded engaging wall 31c than the notched portion 31e. The engaging surface 31d is a surface vertical to the axis line of the perforated cap hole 34 in the removal tool body 31 (the front-back direction of the removal tool body 31), or is sloped to be close to the base end of the protruded engaging wall 31c, while separating from the other facing protruded engaging wall 31c (the latter is shown in the figures).

Accordingly, when the claw 24b on the elastic engaging piece 24 of the cap 20 is entered into the notched portion 31e on the tip of the protruded engaging wall 31c of the removal tool body 31, the engaging surface 31d of the protruded engaging wall 31c can be located so as to face the locking surface 24e of the claw 24b. As a result, the protruded engaging wall 31c is located on a position that can be engaged to the claw 24b from the side of the cap body 23.

Note that the engaging surface of the protruded engaging wall 31c is not limited to the stepped surface, which is a boundary between the notched portion 31e and the portion not having the notched portion 31e in the protruded engaging wall 31c, but can be the apical surface (projecting end surface) of the projecting end of the protruded engaging wall 31c.

As shown in FIGS. 5A and 5B, the incorrect insertion preventing protrusions 251 and 252 protrude from the cap body 23 of the cap 20 shown in the figures to identify the direction of insertion to the perforated cap hole 34 in the removal tool body 31 of the cap removal tool 30. The incorrect insertion preventing protrusions are provided on two portions in the cap body 23.

One of the two incorrect insertion preventing protrusions on the cap body 23 (the first incorrect insertion preventing protrusion 251) is a projecting piece protruded from the front end wall 22 of the cap body 23 toward the front side (opposite to the cylindrical body 21). The first incorrect insertion preventing protrusion 251 protrudes from the central part in the horizontal direction of the one side end in the vertical direction of the front end wall 22. In addition, between both sides in the vertical direction of the front end wall 22, the first incorrect insertion preventing protrusion 251 protrudes from the central part in the horizontal direction of the end portion on the side, which is connected with the first face plate 21a (see FIGS. 6A and 6B) having the key groove 21e in which the key 3d of the optical connector 3 will be inserted.

As shown in FIGS. 9-13, and 15, the one of the cap contacting protrusions 31a and 31b (the first cap contacting protrusion 31a) on both sides in the cross sectional vertical direction of the front end portion of the perforated cap hole 34 in the removal tool body 31 is extended over the whole cross sectional horizontal direction of the front end portion of the perforated cap hole 34. In the cross sectional vertical direction of the front end portion of the perforated cap hole 34, the second cap contacting protrusion 31b, which is located opposite to the first cap contacting protrusion 31a, is formed on both sides of the central part in the cross sectional horizontal direction of the perforated cap hole 34. In the cross sectional horizontal direction of the perforated cap hole 34, the key groove 31f (hereinafter, also referred to as the front end portion key groove), in which the first incorrect insertion preventing protrusion 251 of the cap 20 will be inserted, is formed between the two of the second cap contacting protrusions 31b, as a dent, which dents from the engaging piece insertion hole 32.

As shown in FIGS. 5A and 5B, the other incorrect insertion preventing protrusion (the second incorrect insertion preventing protrusion 252) of the cap 20 is a protrusion protruded from the side of the outer surface (opposite to inner space of the cap body 23) of one of a pair of the lateral plates 21c and 21d of the cap body 23 (the first lateral plate 21c). In the cap 20 shown in the figures, the second incorrect insertion preventing protrusion 252 is a prominence protruded from the side of the outer surface of the first lateral plate 21c, over the whole length in the front-back direction along the axis line of the cap body 23. The one end in the extending direction of the second incorrect insertion preventing protrusion 252 reaches near the front end wall 22 on the front end of the cap body 23.

As shown in FIGS. 13-15 and the like, the key groove 31g (hereinafter, also referred to as the body accommodating hole key groove), in which the second incorrect insertion preventing protrusion 252 of the cap 20 can be inserted, is formed on the inner surface that is located on the one side in the cross sectional horizontal direction of the cap body accommodating hole 33, which is in the housing part 31H of the removal tool body 31 of the cap removal tool 30.

The cap body 23 of the cap 20 can be smoothly inserted into the cap body accommodating hole 33 in the removal tool body 31, only with the direction in which the second incorrect insertion preventing protrusion 252 is inserted into the body accommodating hole key groove 31g of the removal tool body 31.

In addition, the first incorrect insertion preventing protrusion 251 of the cap 20 can be inserted into the front end portion key groove 31f of the removal tool body 31, when the second incorrect insertion preventing protrusion 252 is inserted into the perforated cap hole 34 with the direction in which the second incorrect insertion preventing protrusion 252 is inserted into the body accommodating hole key groove 31g of the removal tool body 31. The cap body 23 of the cap 20, in which the first incorrect insertion preventing protrusion 251 is inserted into the front end portion key groove 31f of the removal tool body 31, can be inserted into the cap body accommodating hole 33 until its front end (the front end wall 22) reaches the position at which the front end wall 22 contacts with the cap contacting protrusions 31a and 31b of the removal tool body 31.

The cap body 23 contacts the cap contacting protrusions 31a and 31b from the rear side in the front-back direction of the removal tool body 31. The engaging piece insertion hole 32 is a perforating hole perforating the front part of the cap body contacting portion, which is located in front of the surface where the cap body 23 is contacted with the cap contacting protrusions 31a and 31b on the removal tool body 31 (the rear side contacting surface).

After insertion of the first incorrect insertion preventing protrusion 251 into the front end portion key groove 31f is initiated, the claw 24b on the elastic engaging piece 24 of the cap 20 is located in front of the engaging surface 31d of the removal tool body 31, at or before the time when the cap body 23 contacts with the cap contacting protrusions 31a and 31b of the removal tool body 31. Before insertion of the first incorrect insertion preventing protrusion 251 into the front end portion key groove 31f is initiated, the claw 24b is located on the rear side of the removal tool body, which is behind the engaging surface 31d of the removal tool body 31 and is not located at a position where the claw 24b can be engaged to the engaging surface 31d.

In the removal tool body 31, positions of the cap contacting protrusions 31a and 31b in the front-back direction of the removal tool body 31 are formed in a parallel manner, so that the cap body 23 inserted into the cap body accommodating hole 33 can contacts both of the first and the second cap contacting protrusions 31a and 31b at the same time.

Even if the cap body 23 of the cap 20 is forced to be inserted into the cap body accommodating hole 33 of the removal tool body 31, such that a position of the second incorrect insertion preventing protrusion 252 is on the side opposite to the body accommodating hole key groove 31g in the cross sectional horizontal direction of the cap body accommodating hole 33 (hereinafter, also referred to as the inverted insertion direction), the first incorrect insertion preventing protrusion 251 contacts the first cap contacting protrusion 31a of the removal tool body 31, and thereby the further insertion into the perforated cap hole 34 is controlled. Accordingly, the claw 24b on the elastic engaging piece 24 of the cap 20 cannot reach the position on which it can be engaged to the engaging surface 31d of the removal tool body 31.

A cap of an embodiment according to the present invention can have both of the first incorrect insertion preventing protrusion 251 and the second incorrect insertion preventing protrusion 252, and alternatively, the cap can have only one of the first incorrect insertion preventing protrusion 251 and the second incorrect insertion preventing protrusion 252.

In addition, a cap having neither the first incorrect insertion preventing protrusion 251 nor the second incorrect insertion preventing protrusion 252 can also be used.

As shown in FIGS. 5A and 5B, in the cap body 23 of the cap 20 shown in the figures, the notched marker 23a is formed as a dent, which dents from the rear end surface of the cap body 23, and thereby direction of the cap 20 can be visually determined. In the cap 20 shown in the figures, the notched marker 23a is formed particularly on the central part in the horizontal direction of the rear end portion of the one of a pair of the face plates 21a and 21b (in the figures, the first face plate 21a) of the cap body 23. The notched marker 23a is not formed on the second face plate 21b.

When the cap 20 is inserted into the cap body accommodating hole 33 in the removal tool body 31 from the front end side of the cap 20, i.e., the side of the elastic engaging piece 24, the notched marker 23a serves as a marker to confirm positions of the first face plate 21a and the first incorrect insertion preventing protrusion 251 on the cap body 23 from the rear end side of the cap 20. In the direction of the cap 20 when it is inserted into the perforated cap hole 34 in the cap removal tool, between a pair of the face plates 21a and 21b of the cap body 23, the first face plate 21a having the notched marker 23a contacts the inner wall of the cap body accommodating hole 33 on the side where the front end portion key groove 31f is formed in the cross sectional vertical direction of the perforated cap hole 34. Accordingly, the first incorrect insertion preventing protrusion 251 of the cap 20 can be inserted into the front end portion key groove 31f of the cap removal tool, and the cap body 23 can also be smoothly inserted into the cap body accommodating hole 33.

As shown in FIGS. 1-3, the optical connector 3 of the cable with caps 10 is protected by covering with the cap 20 and the cap removal tool 30. Accordingly, as shown in FIG. 3 for example, when the unit with a cap removal tool 12 of the cable with caps 10 is led into the periphery of the optical connector adaptor 91 that is provided on the device 90 in buildings and the like, the tip of the optical connector 3 and an optical fiber end surface located on an apical surface (joint end surface) of a ferrule of the optical connector 3 will not be damaged, and its characteristics (optical characteristics and the like) can be stably maintained.

As shown in FIG. 1, the removal tool body 31 of the cap removal tool 30 shown in the figure has a taper shape, that is, the length in the width direction is increased from the front side toward the rear side.

A pair of the cover plates 361 and 362 of the cap removal tool 30 in the unit with a cap removal tool 12 are closed each other to form the case part 37 (a case part for storing the collectively-holding unit 40, see FIGS. 1 and 3), which has a flat appearance, on the rear side of the removal tool body 31, and thickness of the case part is less than or equal to the width of the rear end of the removal tool body 31.

Accordingly, the unit with a cap removal tool 12 of the cable with caps 10 is, for example, advantageous to avoid blockades when under floor wiring, above floor wiring and the like are performed in buildings, and it also promotes efficiency of work to lead the cable with caps 10 into narrower spaces and the like.

As shown in FIG. 10, as the fitting pin 36*a* protruded from the cover plate 361, which is one of a pair of the cover plates 361 and 362 of the cap removal tool 30, is inserted and fitted on the inside of the fitting cylinder 36*b* protruded from the other cover plate 362, the cover plates 361 and 362 can be kept fit each other, and the closed cover plates 361 and 362 are prevented from being opened unexpectedly.

In addition, when an operator tries to open the closed cover plates 361 and 362 by their fingers, the fitting pin 36*a* fitted on the fitting cylinder 36*b* can be forcedly pulled out from the fitting cylinder 36*b* due to a force of the fingers. As the fitting pin 36*a* fitted on the fitting cylinder 36*b* is pulled out from the fitting cylinder 36*b*, a closed state of the fitting pin 36*a* and the fitting cylinder 36*b* is released, and the closed cover plates 361 and 362 will be opened.

Note that a mechanism to keep a pair of the cover plates 361 and 362 closed is not limited to the fitting pin 36*a* and the fitting cylinder 36*b*, which can be closed each other. Any mechanism can be utilized to maintain the closed position, as long as a pair of the cover plates 361 and 362 is kept closed, and an operator can manually release the closed position. For example, an elastic engaging claw protruded from one cover plate that can be engaged to and released from the other cover plate can be used.

A band which bundles a closed pair of the cover plates 361 and 362 to control their opening, a fastening screw for fixation, and the like can also be used as a mechanism to keep the closed position.

By opening a closed pair of the cover plates 361 and 362 of the cap removal tool 30 of the unit with a cap removal tool 12 in the cable with caps 10, and then pulling the cap removal tool 30 with respect to the collectively-holding unit 40 to separate the cap removal tool 30 from the collectively-holding unit 40, the cap removal tool 30 can be easily pulled out from the optical connector 3 together with the cap 20.

The cover plates 361 and 362 released from the closed position can be used as a handle portion to pull the removal tool body 31 against the collectively-holding unit 40.

When the cap removal tool 30 is pulled with respect to the collectively-holding unit 40 to separate the cap removal tool 30 from the collectively-holding unit 40, the removal tool body 31 (particularly, the engaging surface 31*d* on the protruded engaging wall 31*c*), which is engaged to the claws 24*b* on a pair of the elastic engaging pieces 24 of the cap 20 from the side of the cap body 23, can depress the claws 24*b* toward the direction in which the claws 24*b* can be separated from the collectively-holding unit 40. Accordingly, by pulling the cap removal tool 30 with respect to the collectively-holding unit 40 to separate the cap removal tool 30 from the collectively-holding unit 40, the cap 3 can be pulled out from the optical connector 3 in the optical connector alignment unit 11.

When the cap removal tool 30, on which each of the caps 20 is fitted on each of a plurality of the optical connectors 3 that are held in the collectively-holding unit 40, is pulled with respect to the collectively-holding unit 40, a plurality of the caps 20 can be pulled out from the optical connectors 3 at once. Thus, the caps can be efficiently pulled out.

As pulling out of the caps 20 from the optical connectors 3 is completed, the tip of each of the optical connectors 3 held in the collectively-holding unit 40 will be exposed.

Only by inserting the optical connector alignment unit 11, in which the caps 20 and the cap removal tool 30 are removed, into an optical connector adaptor (e.g., the optical connector adaptor 91 shown in FIG. 3), a plurality of the optical connectors 3 collectively held in the collectively-holding unit 40 can be collectively fitted on an optical connector adaptor.

Figure 16:
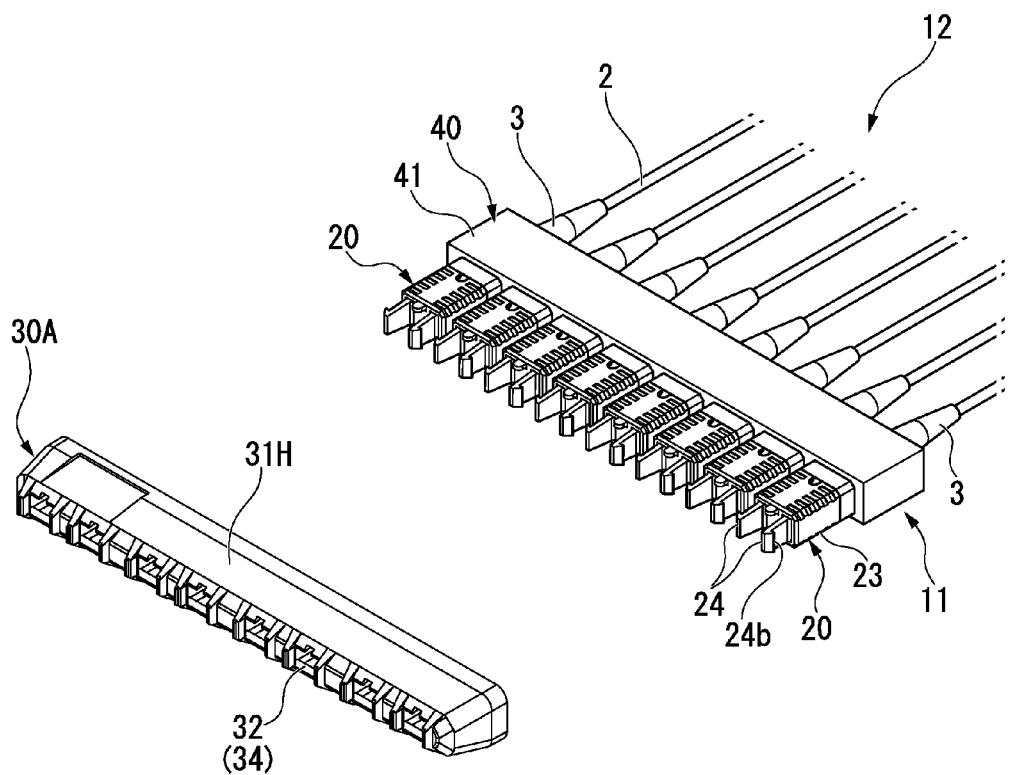
FIG. 16 is an exploded perspective view showing a unit with a cap removal tool, in which a cover plate is omitted from the cap removal tool of FIG. 10.

A cap removal tool for pulling out the caps 20 fitted on the tips of the optical connectors 3 from the optical connectors 3 is not limited to the cap removal tool 30 illustrated in FIGS. 1, 2 and the like. A cap removal tool having a removal tool body, in which engaging piece insertion holes to which the extended portions 24*a* on a pair of the elastic engaging pieces 24 can be interpolated are formed, and the claws 24*b* on the elastic engaging pieces 24 whose extended portions 24*a* are interpolated into the engaging piece insertion holes can be engaged to the removal tool body, can be used as a cap removal tool to pull out the caps 20 from the optical connectors 3. As shown in FIG. 16, an example of a cap removal tool has a structure in which a pair of the cover plates 361 and 362 are omitted from the cap removal tool 30 described in above, that is, its structure is similar to that of the removal tool body 31 of the cap removal tool 30 (cap removal tool 30A).

Note that structures of the cap removal tool 30A are given common reference numbers in FIG. 16, when the structures are similar to those of the removal tool body 31 of the cap removal tool 30 described in above.

Figure 17:
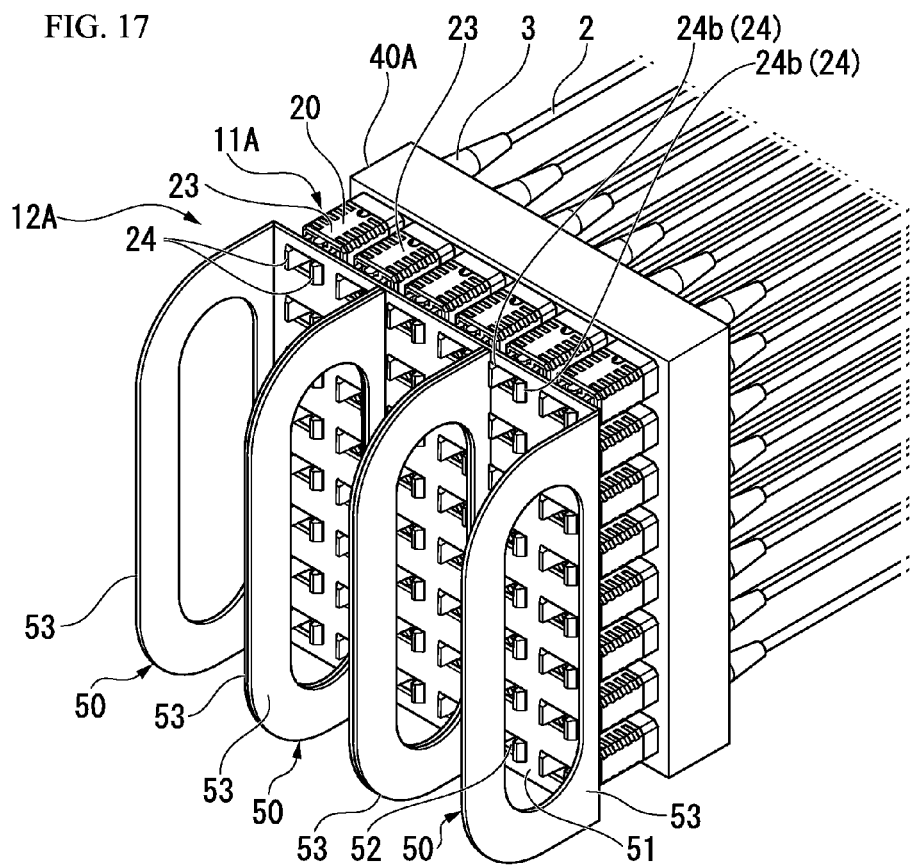
FIG. 17 is a perspective view showing one example of a unit with a cap removal tool, in which the cap removal tool has a plate shaped body having engaging piece insertion holes.

FIG. 17 shows one example of the unit with a cap removal tool 12A having the optical connector alignment unit 11A, in which a number of the optical connectors 3 assembled on the tips of the optical fibers 2 are aligned in a matrix style and collectively held by the collectively-holding unit 40A.

In the collectively-holding unit 40A shown in FIG. 17, 48 optical connectors 3 are aligned in a matrix style and collectively held. The collectively-holding unit 40A, in which a number of (e.g., 8 or more) optical connectors 3 are aligned in a matrix style and collectively held, is not limited to the one in which the number of the optical connectors 3 to be held (the number of connectors to be held) is 48, but others in which the number of connectors to be held is other than 48 can also be used.

The collectively-holding unit 40A shown in FIG. 17 holds the coupling 3*a* of the optical connector 3, so that the optical connector 3 is held as its tip side protrudes from one face of the collectively-holding unit 40A having a plate like shape as a whole.

Figure 18:
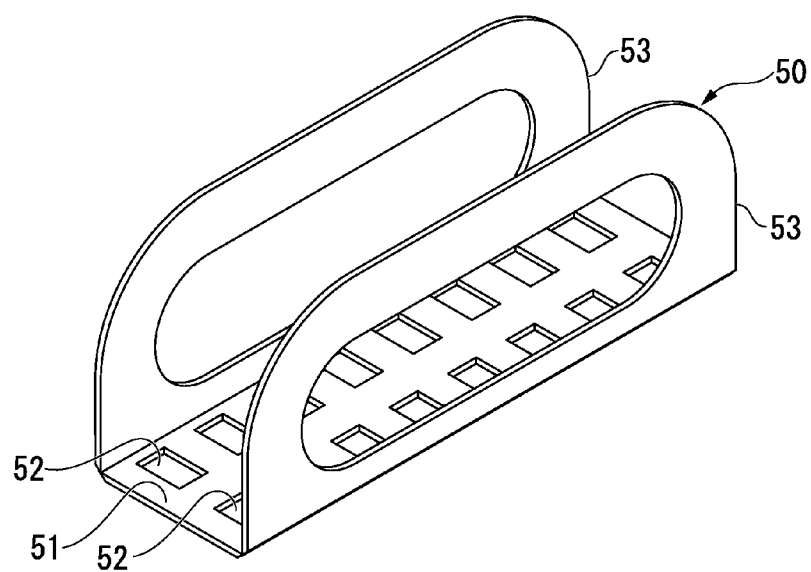
FIG. 18 is a perspective view showing the cap removal tool of the unit with a cap removal tool of FIG. 17.

The unit with a cap removal tool 12A shown in the figures serves as a cap removal tool to pull out the cap 20 fitted on the tip of the optical connector 3 in the optical connector alignment unit 11A from the optical connector 3, and as shown in FIGS. 17 and 18, the unit with a cap removal tool 12A is assembled with the structure having the plate like shaped removal tool body 51, in which a plurality of the engaging piece insertion holes 52 are formed.

In the cap removal tool 50 shown in FIGS. 17 and 18, the handle portions 53 protrude from both sides of the plate-like shaped removal tool body 51, in which a plurality of the engaging piece insertion holes 52 are formed, and an operator can grasp the handle portions 53 with their fingers.

The handle portions 53 are provided on one face of the removal tool body 51, such that they are vertically protruded from both sides of the rectangle plate-like shaped removal tool body 51 (in the figures, from a pair of the long sides of the rectangle plate like shaped removal tool body 51). The handle portions 53 in the cap removal tool 50 shown in the figures are formed mostly as a rectangular shape, and are vertically protruded from the removal tool body 51. As will be described hereinafter, in the structure of the cap removal tool 50, for example, when a plurality of the cap removal tools 50 are provided on the optical connector alignment unit 11A in which the optical connectors 3 are aligned in a matrix style, one handle portion 53 can be contacted with another handle portion 53 on the next cap removal tool 50 by overlapping each other. Accordingly, the cap removal tool 50 is advantageous in that it can align a plurality of optical connectors for the optical connector alignment unit 11A with high density.

The handle portion is not limited to the rectangle frame shape of above, and changes can be made to the design as long as an operator can grasp and pull it with their fingers with respect to the collectively-holding unit 40A of the cap removal tool to pull out caps.

Regarding both faces of the plate like shaped removal tool body 51, hereinafter, the face from which the handle portion 53 protrudes is also referred to as the obverse side, and the opposite side is also referred to as the reverse side.

The engaging piece insertion holes 52 in the cap removal tool body 51 of the cap removal tool 50 shown in FIGS. 17 and 18, are formed as having rectangular cross sections (in the figures, rectangles).

Figure 19:
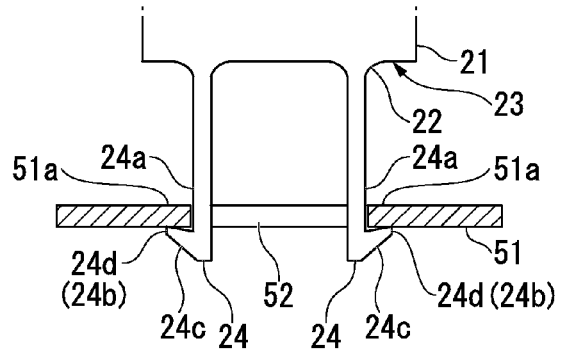
FIG. 19 is a partially enlarged cross-sectional view illustrating a relationship between the body of the cap removal tool of FIG. 17 and elastic engaging pieces of a cap.

As shown in FIGS. 17 and 19, the cap removal tool 50 is attached to the optical connector alignment unit 11A in a direction in which the reverse side of the removal tool body 51 faces to the cap body 23 of the cap 20, and a pair of the elastic engaging pieces 24 of the cap 20 fitted on the optical connector 3 in the optical connector alignment unit 11A are interpolated into the engaging piece insertion hole 52 in the removal tool body 51. The extended portions 24a of a pair of the elastic engaging pieces 24 of the cap 20 are interpolated into the engaging piece insertion hole 52 in the cap removal tool 50. The claws 24b on a pair of the elastic engaging pieces 24 of the cap 20 are located on the obverse side of the removal tool body 51. In a pair of the elastic engaging pieces 24 of the cap 20, a portion from the claws 24b to the side of the cap body 23 (base end side) of the extended portions 24a passes through on both sides in a longitudinal direction of the rectangular shaped engaging piece insertion hole 52.

As shown in FIG. 19, a separation between the apexes 24d of the claws 24b on a pair of the elastic engaging pieces 24 is greater than the dimension in the longitudinal direction of the rectangular shaped engaging piece insertion hole 52. In addition, the protruding length of each of the claws 24b from the elastic engaging piece 24 is greater than a difference between a separation between portions where both of the claws 24b are respectively engaged (hereinafter, also referred to as a claw engaging portion 51a) through the engaging piece insertion hole 52 in the removal tool body 51; and a separation between the outer lateral surfaces of a pair of the elastic engaging pieces 24, which outer lateral surfaces are on the sides opposite to the sides of the inner surface that face each other. In the unit with a cap removal tool 12A shown in FIGS. 17 and 19, the distance between the claw engaging portions 51a on both sides of the engaging piece insertion hole 52 refers to the length in longitudinal direction of the rectangular shaped engaging piece insertion hole 52 in the figures.

In a pair of the elastic engaging pieces 24, each of the portions inserted into the engaging piece insertion hole 52 may contact with each of the claw engaging portions 51a on both sides of the engaging piece insertion hole 52 in the removal tool body 51.

In the removal tool body 51, the claws 24b on a pair of the elastic engaging pieces 24 are located to be engaged to the portions on both sides of the engaging piece insertion hole 52, in which the extended portions 24a are inserted. In the cap removal tool 50, slipping off of the tips of the elastic engaging pieces 24 are controlled by the claws 24b. When the claws 24b on the elastic engaging pieces 24 are engaged to the cap removal tool 50, they serve as locking parts to control slipping off of the tips of the elastic engaging pieces 24 from the cap removal tool 50.

The board thickness of the removal tool body 51 of the cap removal tool 50 is smaller than separation between the cap body 23 of the cap 20 and the claw 24b. The removal tool body 51 of the cap removal tool 50 is provided so as to have a little movable area between the cap body 23 of the cap 20 and the claw 24b, in front-back direction of the cap (the axis line of the cap body 23).

The engaging piece insertion hole 52 is a perforating hole that perforates the plate like shaped removal tool body 51 from its obverse side to reverse side, and the plate like shaped removal tool body 51 serves as a cap body contacting portion with which the cap body 23 can contact.

In the optical connector alignment unit 11A shown in FIG. 17, a plurality of optical connectors 3 (in the figures, eight optical connectors) are aligned in line, and such aligned connectors are provided to be horizontally parallel so that optical connectors 3 are aligned in a matrix.

In the removal tool body 51 of the cap removal tool 50, two hole lines are formed in parallel, in each of which a plurality of the engaging piece insertion holes 52 (in the figures, eight) are aligned in line corresponding to the two connector lines adjacent to each other in the optical connector alignment unit 11A. The forming pitch of the engaging piece insertion holes 52 in each of the hole lines that are formed corresponding to the connector lines in the optical connector alignment unit 11A is adjusted to the array pitch of the optical connectors 3 that compose the connector lines in the optical connector alignment unit 11A.

A total of 16 engaging piece insertion holes 52 are formed in the removal tool body 51 of the cap removal tool 50 shown in FIGS. 17 and 18.

In the unit with a cap removal tool 12A shown in FIG. 17, a plurality of the cap removal tools 50 (in the figures, three), to which a plurality of the caps 20 fitted on the tips of the optical connectors 3 are attached, are provided on the optical connector alignment unit 11A. The caps 20 fitted on the optical connectors 3 in the optical connector alignment unit 11A can be engaged to any of the cap removal tools 50, a plurality of which are provided in the unit with a cap removal tool 12A.

When the cap removal tool 50 in the unit with a cap removal tool 12A is pulled with respect to the collectively-holding unit 40A to increase separation from the collectively-holding unit 40A, a plurality of the caps 20 fitted on the cap removal tool 50 can be pulled out from the optical connectors 3 at once.

The cap removal tool 50 shown in FIGS. 17 and 18 has the removal tool body 51, in which two hole lines of the engaging piece insertion holes 52 are formed in parallel so as to correspond to the two connector lines which are adjacent each other in the optical connector alignment unit 11A. The number of hole lines of the engaging piece insertion holes 52 formed on the plate-like shape removal tool body can be one, or can be three or more.

A cap removal tool having three or more hole lines of the engaging piece insertion holes 52 in its removal tool body can pull out many more of the caps 20 from the optical connectors 3 at once, compared to a cap removal tool having only two hole lines of the engaging piece insertion holes 52.

A unit with a cap removal tool having an optical connector alignment unit in which optical connectors 3 are aligned in a matrix is not limited to the structure composed of a plurality of cap removal tools, but a structure composed of only one cap removal tool can also be used.

The cap removal tool 50 shown in the figures is integrally formed with a metal. Cap removal tools can be easily formed by, for example, punching and bending processes of one metal plate.

In addition, for example, cap removal tools integrally formed with plastics can also be used.

Because a plate like shaped removal tool body of a cap removal tool, in which engaging piece insertion holes 52 are formed, has a simple structure, the number of engaging piece insertion holes 52 formed in the removal tool body can be easily changed for designing. Positions, sizes, and shapes of the engaging piece insertion holes 52 in the removal tool body of the cap removal tool can also be easily adjusted, and thus, a cap removal tool is compatible with positions and designs of the elastic engaging pieces 24 of the caps 20, each of which are fitted on each of the tips of a plurality of the optical connectors 3 in the optical connector alignment unit.

Figure 20:
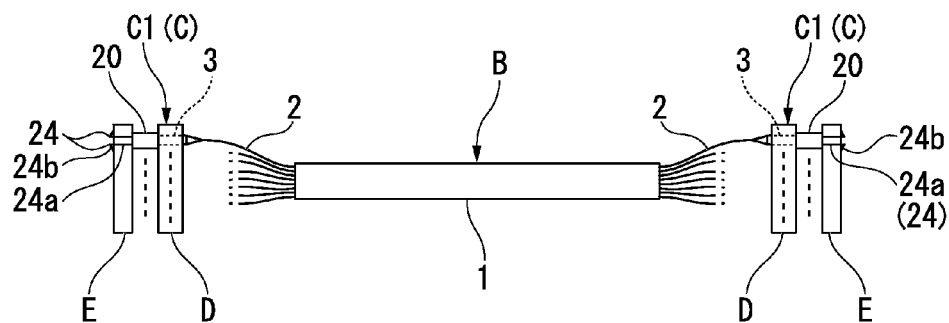
FIG. 20 shows one example of an optical fiber cable with a connector cap, in which both longitudinal ends of an optical fiber cable has a unit with a cap removal tool.

As shown in FIG. 20 for example, in addition to a structure in which a unit with a cap removal tool is assembled only on one end side in the longitudinal direction of the optical fiber cable 1, a structure in which the unit with cap removal tools C are assembled on both sides in the longitudinal direction of the optical fiber cable 1 can also be used as a cable with caps. The reference number B is given to the cable with caps in FIG. 20. Also, the reference number C1 is given to one of the units with cap removal tools C that are on both sides in the longitudinal direction of the optical fiber cable 1, and the reference number C2 is given to the other.

In the cable with caps B, the units with cap removal tools C1 and C2 are assembled on both sides in the longitudinal direction of the optical fiber cable with connectors (optical fiber cable with both end connectors) in which optical connectors 3 are provided on the tips of the optical fibers 2 that are exposed to both end terminals in the longitudinal direction of the optical fiber cable 1.

The unit with cap removal tools C1 and C2 are provided, such that the cap removal tool E is attached to the caps 20 in an optical connector alignment unit to pull out the caps 20 fitted on the tips of the optical connectors 3. In the optical connector alignment unit, a plurality of the optical connectors 3 on the tips of the optical fibers 2, which are extended from the terminals of the optical fiber cable 1, are collectively held in the collectively-holding unit D.

According to the collectively-holding units 40 and 40A, which are shown in FIGS. 4, 17, and the like as the collectively-holding units D, units with cap removal tools C that can collectively hold and align a plurality of the optical connectors 3 can be used. The caps 20 are fitted on the outside of the tips protruded from the collectively-holding unit D for the optical connectors 3.

The cap removal tool E can be located between the claws 24b and the cap body 23, so that the removal tool body (particularly, a cap body contacting portion of the removal tool body) which can contact with the cap body 23 of the cap 20 can be engaged to the claws 24b on the tips of the elastic engaging pieces 24, in which the extended portions 24a are inserted into an engaging piece insertion hole perforating the removal tool body.

According to the cap removal tools 30 and 30A shown in FIGS. 1, 2, 16 and the like, for example, one having a plurality of perforated cap holes, which are composed of cap body accommodating holes and engaging piece insertion holes communicating therewith, one having a plate-like shaped removal tool body, in which a plurality of claw insertion holes are formed as similar to the cap removal tool 50 shown in FIG. 17 (in FIG. 17, referred to as an engaging piece insertion hole) and the like can be used as the cap removal tool E.

Structures of the units with a cap removal tools C1 and C2 on both sides of the cable with caps B are not necessarily the same, but their structures can be different from each other.

When light irradiation from the front side of a unit with a cap removal tool to the thin-walled portion 22c of the cap 20 is not needed, the structure of the cap removal tool E is not particularly limited, as long as it has a removal tool body engaging to locking parts, which are formed on the projecting pulling pieces protruded from the front end wall of the cap (in FIG. 21, the claws 24b on the elastic engaging pieces 24), from the side of the front end wall, and it can pull out a plurality of caps from the optical connectors 3.

A cable with caps of an embodiment according to the present invention is not limited to the one having a unit with a cap removal tool. In addition, as a cable with caps, structures having neither units with cap removal tools nor optical connector alignment units, and structures having optical connector alignment units, but not having units with cap removal tools can also be used. Note that as a cable with caps, structures having optical connectors with caps, in which the caps 20 are fitted on the optical connectors 3, on the tips of a plurality of the optical fibers 2 exposed on (extended from) both side terminals or one side terminal in the longitudinal direction of the optical fiber cable 1 can be used.

Figure 21:
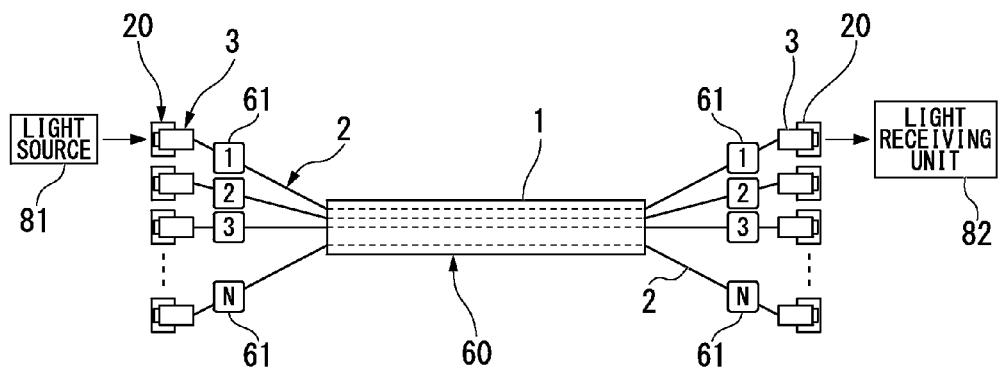
FIG. 21 is a modeling diagram illustrating a fiber contrasting work by using the optical fiber cable with a connector cap of FIG. 20.

The cable with caps 60 shown in FIG. 21 has the optical connectors with caps 5, in which the caps 20 are fitted on the optical connectors 3, on the tips of a plurality of the optical fibers 2 exposed on (extended from) both side terminals in the longitudinal direction of the optical fiber cable 1. However, the cable with caps 60 has neither any optical connector alignment units nor any units with cap removal tools.

The cap 20 shown in FIGS. 5A, 6A, 6B, 7A, and 7B has the thin-walled portion 22c, which is formed to be thin-walled compared to other portions in the front end wall 22, on the central part of the front end wall 22 of the cap body 23 (central part in a direction vertical to the axis line of the cap body 23).

The light transmission rate of the cap 20 is suppressed by applying plastic materials whose light transmission rate is not high, and by contaminants in plastic materials such as a coloring agent. However, the light transmission rate of the cap 20 depends on the thickness of the material forming the cap 20. The light transmission rates of portions other than the thin-walled portion 22c of the cap 20 are especially low compared to those of the thin-walled portion 22c, and such a lower transmission rate ensures a higher light blocking effect. The light transmission rate of the thin-walled portion 22c is higher than those of other portions of the cap body 23.

The optical connector 3 on which the cap 20 is fitted can be subjected to an end surface inspection without pulling out the cap 20, by irradiating the joint end surface 3e including the fiber exposed area 3f of the optical connector 3 with light from the outside of the cap 20 through the thin-walled portion 22c, to inspect whether any scratches or dust are present on the joint end surface 3e (in particular, fiber exposed area 30.

Figure 7A:
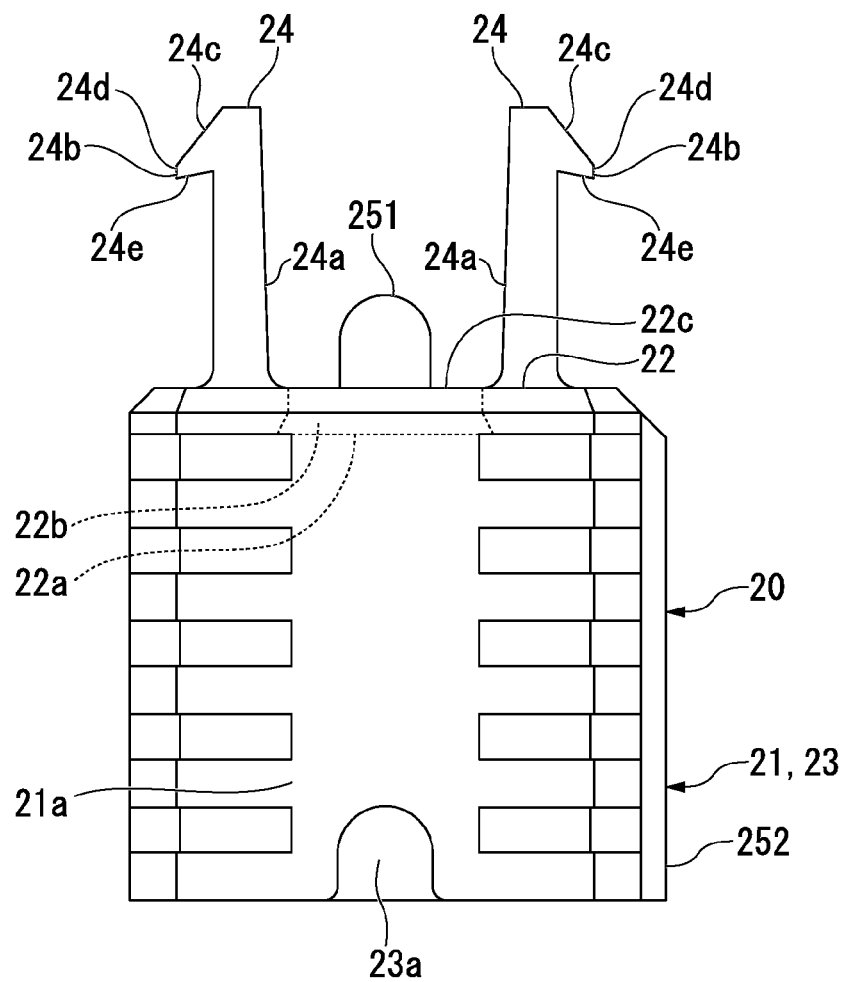
FIG. 7A is a side view illustrating the cap of the unit with a cap removal tool of FIG. 1.

As shown in FIGS. 6A, 6B, and 7A, the dent 22b is formed on the central part of the front end wall 22 of the cap body 23, and the dent 22b dents from the side of the inner surface 22a (inner surface of the cap body 23). The thin-walled portion 22c is the central part of the front end wall 22 on which the dent 22b has been formed, and thereby it has become thin-walled compared to other parts where the dent 22b is not formed.

As shown in FIGS. 5A, 7A, and the like, the thin-walled portion 22c is formed between a pair of the elastic engaging pieces 24 of the cap 20.

Figure 7B:
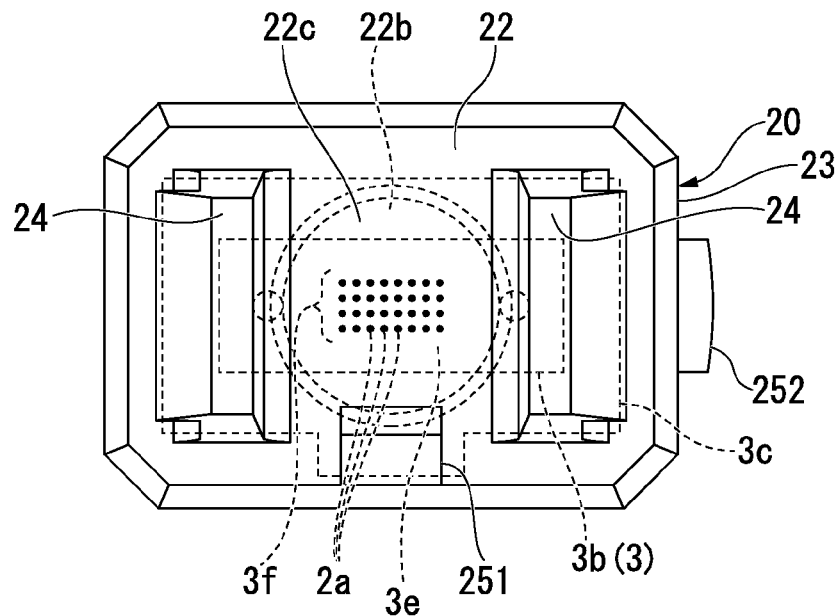
FIG. 7B is a front view (a view from the front side) illustrating the cap of the unit with a cap removal tool of FIG. 1.

As shown in FIGS. 4 and 7B, there is an area on which an apical surface of a bare optical fiber of the optical fiber 2, on which the optical connector 3 is assembled, is exposed (fiber exposed area 3f), in the central part of the joint end surface (particularly, joint end surface 3e of the front end of the ferrule 3b) of the optical connector 3. In the fiber exposed area 3f of the central part of the joint end surface 3e of the ferrule 3b of the optical connector 3 shown in the figures, apical surfaces of a plurality of the bare optical fibers 2a of the optical fiber 2 that is a multicore optical fiber cord are aligned.

When the cap 20 is fitted on the outside of the tip of the optical connector 3, the thin-walled portion 22c is located so as to face the fiber exposed area 3f of the central part of the joint end surface 3e (herein, also referred to as the optical connector end surface) of the optical connector 3. Forming area of the thin-walled portion 22c on the front end wall 22 of the cap body 23 is kept, so that the thin-walled portion 22c faces to all tip surfaces of the bare optical fibers 2a, which are exposed to the fiber exposed area 3f of the optical connector on which the cap body 23 is fitted. Then, in the optical connector 3 assembled on the tip of the optical fiber 2, the joint end surface 3e can be inspected without pulling out the cap 20, by irradiating the joint end surface 3e with light through the thin-walled portion 22c of the cap 20. Accordingly, the optical connector 3 on which the cap 20 is fitted can be subjected to an end surface inspection without pulling out the cap 20, by irradiating the joint end surface 3e including the fiber exposed area 3f of the optical connector 3 with light from the outside of the cap 20 through the thin-walled portion 22c, to inspect whether any scratches or dust are present on the joint end surface 3e.

When a conventional cap not having the thin-walled portion 22c by which optical connector end surface can be inspected is fitted on an optical connector of an optical fiber cable with a connector, in which an optical connector is assembled on the tip of an optical fiber exposed to a terminal of an optical fiber cable, the cap must be removed before an inspection of an end surface of the optical connector as a final product, and the cap must be placed on the optical connector again after the inspection is completed. Accordingly, if any scratches are made, or dust is attached on an end surface of an optical connector when a cap which has been removed from the optical connector is placed on the optical connector again following an inspection, such scratches or dust cannot be detected.

On the other hand, the optical connector 3 on which the cap 20 having the thin-walled portion 22c is fitted can be subjected to an end surface inspection without pulling out the cap 20, and thus there is no concern that scratches are made or dust is attached on the end surface of the optical connector 3 after an inspection is completed.

An antistatic agent can be added to a forming material of the cap 20.

The cap 20 formed with a material such as plastics, which contain an antistatic agent, will be resistant to attachment of dust. Accordingly, when the cap body 23 of the cap 20 is fitted on the outside of the tip of the optical connector 3, dust can hardly get inside the cap body 23, and attachment of dust on the end surface of the optical connector 3 will be prevented.

In addition to increasing of the light transmission rate, mechanical strength is also required for the thin-walled portion 22c of the cap 20, and thus a thickness of the thin-walled portion 22c should not be made too thin. An appropriate thickness of the thin-walled portion 22c of the cap 20 made with plastics is about 0.2-0.5 mm.

As shown in FIG. 4, when the cap 20 is fitted on the optical connector 3, clearance is ensured between the fiber exposed area 3f in the joint end surface 3e of the optical connector 3 and the thin-walled portion 22c of the cap body 23 by the dent 22b formed on the front end wall 22 of the cap body 23.

As shown in FIG. 7B, all of the fiber exposed area 3f in the joint end surface 3e of the optical connector 3 is located so as to face the thin-walled portion 22c, which forms the bottom of the dent 22b on the front end wall 22 of the cap body 23. Therefore, when the cap 20 is fitted on the optical connector 3, none of the fiber exposed area 3f contacts the front end wall 22 of the cap body 23 by the dent 22b, and thereby the fiber exposed area 3f is kept separate from the front end wall 22. In addition, contact between apical surfaces of all of the bare optical fibers 2a exposed to the fiber exposed area 3f of the optical connector 3 and the front end wall 22 (particularly, thin-walled portion 22c) of the cap body 23 can also be avoided.

Accordingly, the structure avoiding contact of the fiber exposed area 3f and apical surfaces of the bare optical fibers 2a exposed to the fiber exposed area 3f with the front end wall 22 of the cap body 23 is advantageous for preventing scratches on the fiber exposed area 3f and apical surfaces of the bare optical fibers 2a.

The cable with caps 60 can be subjected to fiber contrast (fiber identification) without removing the caps 20 fitted on the optical connectors 3 that are on both sides in the longitudinal direction of the cable with caps 60, by entering light generated by the light source 81 from the optical connector 3 that is on one end in the longitudinal direction of the cable with caps 60 (in FIG. 21, left side) to the optical fibers 2.

In a method for line contrast shown in FIG. 21, light generated by the light source 81 is entered from the optical connector 3 that is on one end in the longitudinal direction of the cable with caps 60 to the optical fibers 2. Then, the light entered from the light source 81 to the optical fibers 2 is received at the light receiving unit (light receiving apparatus 82) as output light, which is outputted from apical surfaces of the optical fibers 2 exposed to the joint end surface on the tip of the optical connector 3 that is located on the other end in the longitudinal direction of the cable with caps 60 (in FIG. 21, right side).

For entering light from one end in the longitudinal direction of the cable with caps 60 to the optical fibers 2, light generated by the light source 81 is entered into the optical fibers 2 whose apical surfaces are exposed to the joint end surface of the optical connector 3, through the thin-walled portion 22c of the cap 20 fitted on the optical connector 3. The light entered into the optical fibers 2 is outputted from the apical surfaces of the optical fibers 2 exposed to the joint end surface of the optical connector 3, which is located on the other end in the longitudinal direction of the cable with caps 60. Then, the output light is received at the light receiving unit (light receiving apparatus 82) through the thin-walled portion 22c of the cap 20 fitted on the optical connector 3.

In the cable with caps 60 shown in FIG. 21, an identification sign 61 (numbering) is provided for each of extended portions of the optical fibers 2, which are extended from both sides in the longitudinal direction of the optical fiber cable 1. In addition to checking of the identification sign 61, a fiber contrast in which light entered from one end in the longitudinal direction of the cable with caps 60 into the optical fibers 2 is outputted from the end surfaces of the optical fibers 2 that are on the other end in the longitudinal direction of the cable with caps 60, and is received by a light receiving unit can be used as a fiber contrast (fiber identification) of the optical fibers 2 that are on both sides in the longitudinal direction of the optical fiber cable 1, and thereby fiber contrast will be more accurate.

An accurate contrast of the optical fibers 2 that are on both sides in the longitudinal direction of the optical fiber cable 1 contributes to an accurate alignment of the optical connectors 3, when the unit with a cap removal tools are assembled on both sides in the longitudinal direction of the optical fiber cable 1.

The end surface inspection in which the end surface of the optical connector 3 is irradiated with light from the outside of the cap 20 fitted on the optical connector 3 through the thin-walled portion 22c of the front end wall 22 of the cap body 23 can be applied to the optical connector in the unit with a cap removal tool shown in FIGS. 1, 2, 16, 17 and the like.

In the cap removal tools 30 and 30A shown in FIGS. 1, 2, 16, and the like, each of a pair of the elastic engaging pieces 24 can be kept separated from each other, when the extended portions 24a of a pair of the elastic engaging pieces 24 of the cap 20 are inserted into the engaging piece insertion hole 32, and the cap body contacting portion is located between the claw 24b on each of the elastic engaging pieces 24 and the cap body 23. Thus, in the unit with a cap removal tool composed of the cap removal tool, the thin-walled portion 22c of the cap body 23 can be irradiated with light from in front of the unit with a cap removal tool through the engaging piece insertion hole 32.

In the cap removal tool 50 shown in FIG. 17, each of a pair of the elastic engaging pieces 24 can be kept separated from each other, when the removal tool body 51 that serves as the cap body contacting portion is located between the claws 24b on a pair of the elastic engaging pieces 24 of the cap 20 whose extended portions 24a are inserted into the engaging piece insertion hole 52 and the cap body 23. In the unit with a cap removal tool composed of the cap removal tool 50, the thin-walled portion 22c of the cap body 23 can be irradiated with light from in front of the unit with a cap removal tool through the engaging piece insertion hole 52.

Accordingly, an end surface inspection of the optical connector 3 can be performed to the cable with caps having the unit with a cap removal tool composed of the cap removal tools 30, 30A, and 50, without pulling out the cap 20 fitted on the optical connector 3.

A cap removal tool that can be subjected to an end surface inspection of the optical connector 3 without pulling out the cap 20 fitted on the optical connector 3 is not limited to the cap removal tools 30, 30A, and 50. A cap removal tool having a structure, in which when a removal tool body, which can be contacted with the cap body 23 of the cap 20 (particularly, a cap body contacting portion of the removal tool body), is located between claws 24b on the tips of the elastic engaging pieces 24 whose extended portions 24a are inserted into the engaging piece insertion hole that perforates the removal tool body and the cap body 23, in front of the central part of the front end wall 22 of the cap 20 is not covered, and thereby irradiation from in front of the unit with a cap removal tool to the thin-walled portion 22c is made possible, can be used.

As a cap of an embodiment according to the present invention, a cap not having the thin-walled portion 22c can also be used.

When an end surface inspection of the optical connector and a fiber contrast performed by inducing light to the optical fibers 2 of the optical fiber cable, are not needed, the cap having the thin-walled portion 22c is not needed to be used.

Figure 22:
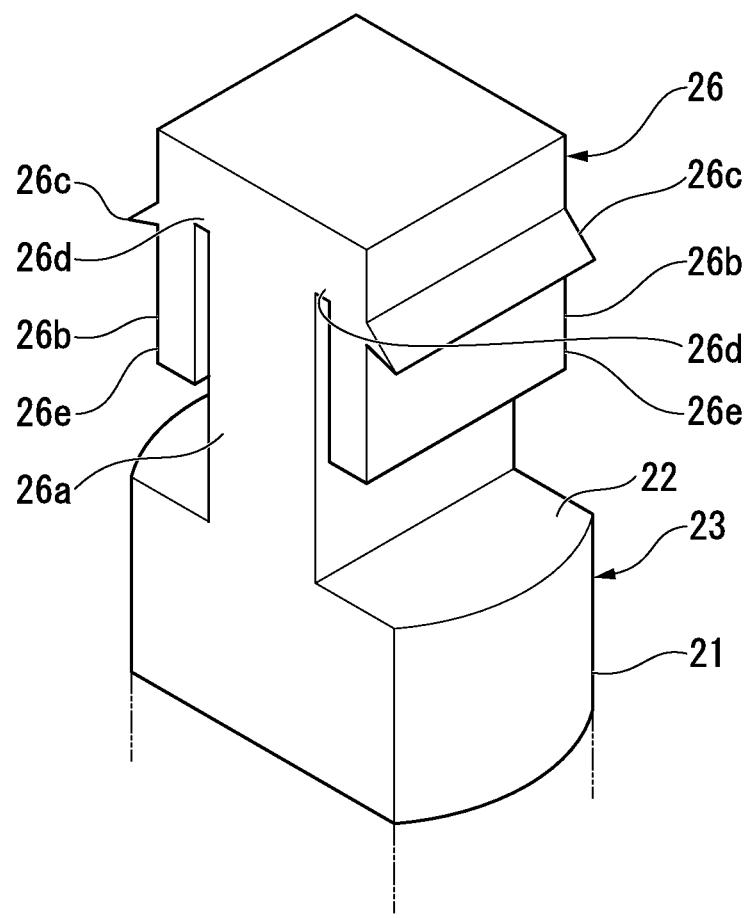
FIG. 22 is a perspective view showing one modification example of elastic engaging pieces of a cap, in which an elastic piece having a protruding claw that can be engaged to a cap removal tool is extended from both sides of the tip of an extended portion toward the cap body, and the extended portion is extended from the front end of a cap body.

An elastic engaging piece of a cap is not limited to the structures shown in FIGS. 5A, 5B, 7A and the like. An elastic engaging piece, for example as shown in FIG. 22, having a pair of the elastic pieces 26b protruded from the tip of the extended portion 26a, which protrudes from the front end wall 22 of the cap body 23 toward the front side (opposite to the cylindrical body 21), to both sides of the extended portion 26a, and the claw 26c that can be engaged to a removal tool body of a cap removal tool protrudes from each of a pair of the elastic pieces 26b can also be used. The elastic pieces 26b of the elastic engaging pieces 26 shown in the FIG. 20, has the base ends 26d protruded from the lateral faces of the tip of the extended portion 26a and the cantilever-type elastic piece bodies 26e that extended from the tip of the base ends 26d toward the cap body 23. The claws 26c protrude from faces opposite to the extended portions 26b of the elastic piece bodies 26e.

The elastic engaging pieces 26 can be inserted into both of the engaging piece insertion holes, which are in the removal tool body 31 of the cap removal tool 30 shown in FIG. 2 and the like, and in the removal tool body 51 of the cap removal tool 50 shown in FIGS. 17 and 18; and can lock the removal tool bodies with the claws 26c. The claw 26c serves as a locking part to lock a removal tool body.

Figure 23A:
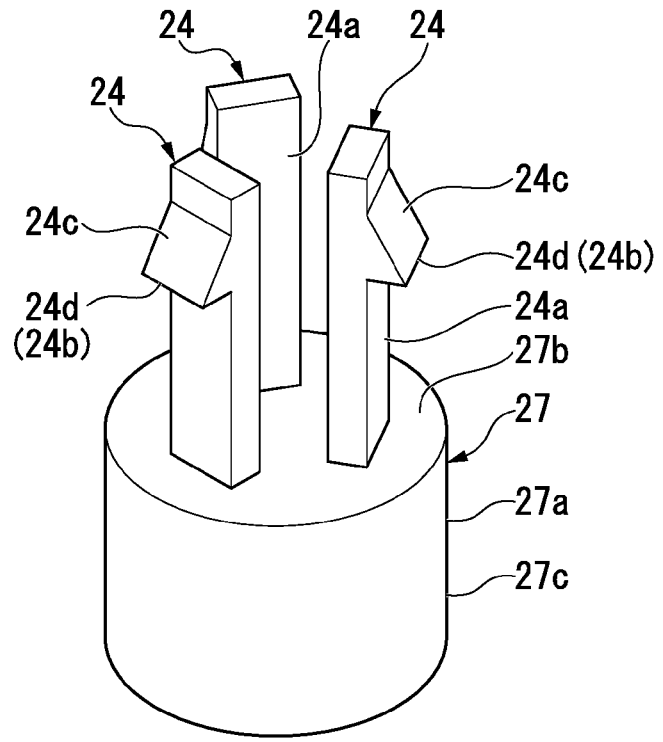
FIG. 23A is a perspective view showing around the elastic engaging pieces, and is illustrating a cap in which three elastic engaging pieces are protruded from the front end wall of the cap body.
Figure 23B:
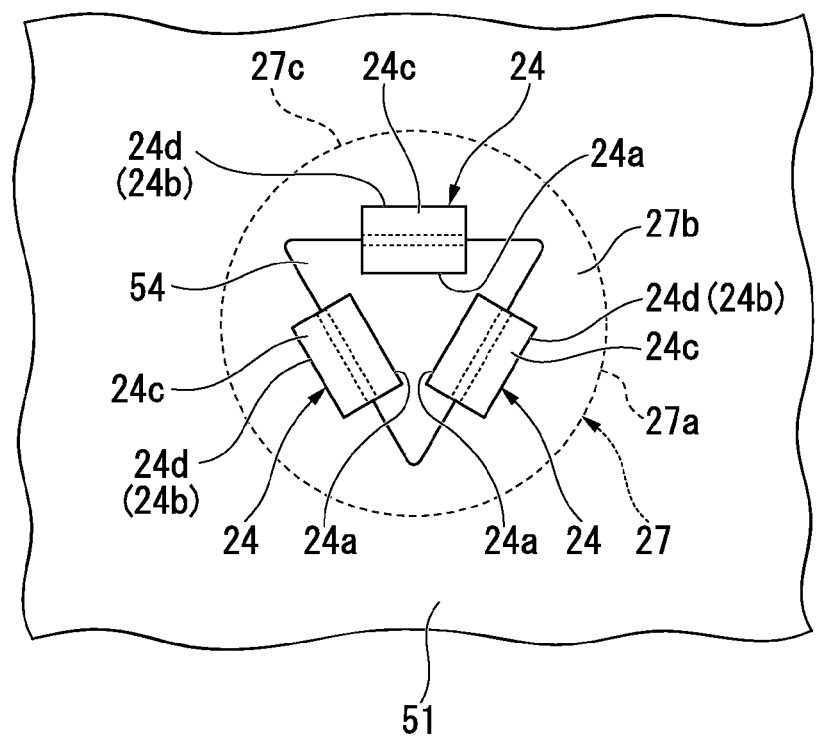
FIG. 23B is a plan view illustrating a relationship between a triangular engaging piece insertion hole formed in a cap removal tool and three elastic engaging pieces, and is illustrating a cap in which three elastic engaging pieces are protruded from the front end wall of the cap body.

As shown in FIGS. 23A and 23B, a cap having three of the elastic engaging pieces 24 can also be used.

In this case, an engaging piece insertion hole in the cap removal tool 50 having the plate-like shaped removal tool body 51 preferably has a cross sectional triangular shape (engaging piece insertion hole 54), corresponding to the claw on each of the elastic engaging pieces.

The cap 27 shown in FIGS. 23A and 23B has the cap body 27c having one end bottomed circular cylindrical shape, in which only one end on the axis line of the circular cylindrical shaped cylindrical body 27a is covered by the front end wall 27b.

The cap body 27c of the cap 27 can be fitted detachably and attachably on the outside of the tip of a coupling of an optical connector having a circular cylindrical shaped coupling to cover the tip of a ferrule. Such optical connectors are, for example, FC optical connectors (F01 optical connectors defined by JIS C5970, FC: Fiber transmission system optical Connector), so-called ST optical connectors (F09 optical connectors defined by JIS C5978) and the like; and such circular cylindrical shaped couplings are connector nuts for FC optical connectors, and connector sleeves for ST optical connectors.

The structure, in which three elastic engaging pieces 24 protrude from the front end wall of the cap body toward the front side that is opposite to the cylindrical body, is not limited to the cap 27 having the one end bottomed circular cylindrical shaped cap body 27c as shown in FIGS. 23A and 23B, and can also be applied to the cap having an one end bottomed square tube shaped cap body.

In addition, the structure of the cap 20 shown in FIGS. 5A, 5B and the like, in which two elastic engaging pieces 24 are protruded from the front end wall of the cap body toward the front side that is opposite to the cylindrical body can also be applied to the cap having one end bottomed circular cap body.

The design of a cap body of a cap can suitably be changed to the one end bottomed cylindrical shape, which can be detachably and attachably fitted on the outside of the tip of an optical connector, depending on a structure of the tip of the optical connector. This is applied for all caps according to embodiments of the present invention.

Figure 24:
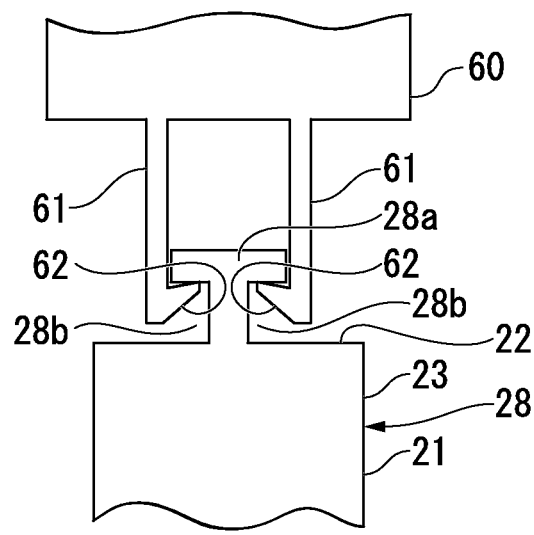
FIG. 24 illustrates one example of a cap in which a projecting pulling piece, which can be engaged to elastic engaging pieces protruded from a cap removal tool, protrudes from the front end wall of the cap body.
Figure 25:
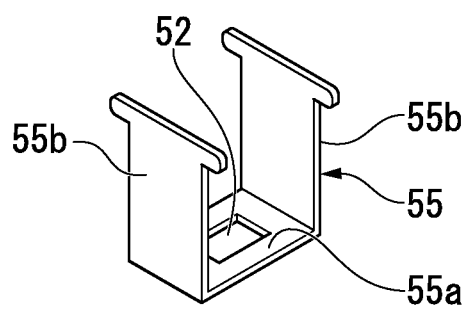
FIG. 25 is a perspective view illustrating one modification example of a cap removal tool.

Also, as shown in FIG. 24 for example, a cap in which the projecting pulling piece 28a, on which the engaging dent 28b is formed, protrudes from the front end wall 22 of the cap body 23 of the cap toward the front side that is opposite to the cylindrical body 21 can also be used as a cap in the unit with a cap removal tool. The projecting pulling piece 28a having the engaging dents 28b on both sides thereof is used in the cap 28 shown in FIG. 24. In the unit with a cap removal tool shown in FIG. 24, the cap removal tool 60 from which a pair of the elastic engaging pieces 61 are protruded is used, and the claws 62 on the tips of a pair of the elastic engaging pieces 61 of the cap removal tool 60 are trapped in, and engaged to the engaging dents 28b that are on both sides of the projecting pulling piece 28a of the cap 28.

Note that an operator can pull out the cap having a projecting pulling piece (including elastic engaging pieces) (hereinafter, referred to as the cap with a projecting piece) from an optical connector, also by pulling the projecting pulling piece directly with the operator's fingers. That is, a cap with a projecting piece fitted on an optical connector can be easily pulled out from the optical connector without a cap removal tool, when an operator pulls the projecting pulling piece directly with their fingers to apply a relative displacement force (drawing out force) to the cap with a projecting piece with respect to the front side of the optical connector.

A projecting pulling piece of a cap with a projecting piece protrudes from a front end wall of a cap body toward a side opposite to a cylindrical body. Thus, by using the cap with a projecting piece, for example, when a plurality of optical connectors on which the caps are fitted are aligned with high density, or when blockades such as building walls existing near the optical connector with a cap, an operator can easily grasp the projecting pulling piece and can efficiently pull out the cap from the optical connector.

The cap removal tool is not limited to the cap removal tool 50 shown in FIGS. 17 and 18, in which a plurality of projecting piece insertion holes 52 (engaging piece insertion holes) are formed in the removal tool body 51, but the cap removal tool, for example as shown in FIG. 24, in which the only one projecting piece insertion hole 52 (engaging piece insertion hole) is formed in the plate shaped removal tool body 55a can also be used. In the cap removal tool 55 shown in FIG. 24, the only one projecting piece insertion hole 52 is formed in the removal tool body 55a, and the handle portions 55b that protrude from one face of the removal tool body 55a vertically protrude from both sides of the removal tool body 55a. The design of a shape of the projecting piece insertion hole 52 can suitably be changed depending on the number, location and the like of the elastic engaging piece (projecting pulling piece) of the cap, so that the claw on the tip of the elastic engaging piece can be engaged to the removal tool body.

However, the cap removal tool is not necessarily limited to the structure having the handle portions vertically protruded from the removal tool body, but a structure in which a cap can be pull out from an optical connector by applying a pulling out force for pulling out a cap directly to outer circumference of a removal tool body can also be used.

In addition, regarding perforated cap holes in a cap removal tools shown in FIGS. 1, 16, and the like, a cap removal tool having the only one perforated cap hole can also be used.

What is claimed is:

1. A cap for protecting an optical connector, the cap comprising:
   a cap body and a projecting pulling piece attached to the cap body, the cap body comprising:
      a cylindrical body comprising a first end and a second end, opposite to the first end;
      a front end wall disposed at the first end of the cylindrical body; and
      a rear end opening formed at the second end of the cylindrical body, wherein the rear end opening is configured to receive the optical connector therein;
   wherein the projecting pulling piece is attached to and protrudes from the front end wall and is configured such that a drawing out force applied to the projecting pulling piece pulls out the cap body from around the optical connector;
   wherein the front end wall comprises a first portion, disposed along an axis line of the cap body, wherein the first portion is a thin-walled portion, and a second portion, disposed around the first portion, wherein a thickness of the second portion is greater than a thickness of the first portion, and a light transmission rate of the first portion is greater than a light transmission rate of the second portion; and
   wherein the projecting pulling piece protrudes from the second portion of the front end wall.

2. The cap for protecting the optical connector according to claim 1, wherein the projecting pulling piece comprises an extended portion which extends from the front end wall of the cap body and a claw disposed on an end of the extended portion.

3. An optical fiber cable connecting system, comprising:
   an optical fiber cable, an optical connector, and a cap for protecting the optical connector, wherein the cap is attached to the optical connector;
   wherein the cap comprises a cap body and a projecting pulling piece attached to the cap body, the cap body comprising:
      a cylindrical body comprising a first end and a second end, opposite the first end,
      a front end wall disposed at the first end of the cylindrical body, and
      a rear end opening formed at the second end of the cylindrical body, wherein the rear end opening is configured to receive the optical connector therein;
   wherein the projecting pulling piece is attached to and protrudes from the front end wall and is configured such that a drawing out force applied to the projecting pulling piece pulls out the cap body from around the optical connector;
   wherein the front end wall comprises a first portion, disposed along an axis line of the cap body, wherein the first portion is a thin-walled portion, and a second portion, disposed around the first portion, wherein a thickness of the second portion is greater than a thickness of the first portion, and a light transmission rate of the first portion is greater than a light transmission rate of the second portion; and
   wherein the projecting pulling piece protrudes from the second portion of the front end wall.

4. The optical fiber cable connecting system according to claim 3, wherein the projecting pulling piece comprises a locking part at an end thereof, and the optical fiber cable apparatus further comprises:
   a cap removal tool comprising a removal tool body which engages with the locking part.

5. The optical fiber cable connecting system according to claim 4, wherein:
   the projecting pulling piece comprises an extended portion which extends from the front end wall of the cap body and the locking part comprises a claw disposed on an end of the extended portion; and
   the removal tool body of the cap removal tool comprises a projecting piece insertion hole formed therein which is penetrable by the extended portion of the projecting pulling piece and which engages with the claw of the projecting pulling piece.

6. The optical fiber cable connecting system according to claim 5, wherein the removal tool comprises a plurality of the projecting piece insertion holes aligned in the removal tool body.

7. The optical fiber cable connecting system according to claim 5, wherein:
- the projecting pulling piece of the optical connector protecting cap protrudes from a portion of the front end wall between an outer circumference of the front end wall and a center of the front end wall; and
- the removal tool body of the cap removal tool is retained on the optical connector protecting cap between by the locking part of the projecting pulling piece of the optical connector protecting cap and the outer circumference of the front end wall.

8. The optical fiber cable connecting system according to claim 4, wherein the cap removal tool comprises a handle portion protruding from the removal tool body.

9. The optical fiber cable connecting system according to claim 3, further comprising a collectively-holding unit which holds a plurality of the optical connectors in alignment.

10. The optical fiber cable connecting system according to claim 9, wherein:
- a first optical connector alignment unit is connected to a first end of the optical fiber cable and a second optical connector alignment unit is connected to a second end of the optical fiber cable.

11. An optical cap and removal tool system comprising:
- a cap for protecting an optical connector, the cap comprising a cap body and a projecting pulling piece attached to the cap body, the cap body comprising:
    - a cylindrical body comprising a first end and a second end, opposite to the first end;
    - a front end wall disposed at the first end of the cylindrical body; and
    - a rear end opening formed at the second end of the cylindrical body, wherein the rear end opening is configured to receive the optical connector therein;
    - wherein the projecting pulling piece is attached to and protrudes from the front end wall and is configured such that a drawing out force applied to the projecting pulling piece pulls out the cap body from around the optical connector, and wherein the projecting pulling piece comprises an extended portion extending from the front end wall and a locking part disposed on an end of the extended portion; and
- a cap removal tool comprising a removal tool body which is engaged with the locking part, such that a drawing out force applied to the cap removal tool is transferred to the optical connector protecting cap.

12. The optical cap and removal tool system according to claim 11, wherein:
- the locking part of the projecting pulling piece comprises a claw; and
- the removal tool body comprises a projecting piece insertion hole formed therein which is penetrable by the extended portion of the projecting pulling piece and which engages with the claw of the projecting pulling piece.

13. The optical cap and removal tool system according to claim 12, wherein the removal tool comprises a plurality of the projecting piece insertion holes aligned in the removal tool body.

14. The optical cap and removal tool system according to claim 12, wherein:
- the projecting pulling piece of the optical connector protecting cap protrudes from a portion of the front end wall between an outer circumference of the front end wall and a center of the front end wall; and
- the removal tool body of the removal tool is retained on the optical connector protecting cap between the locking part of the projecting pulling piece of the optical connector protecting cap and the outer circumference of the front end wall.

15. The optical cap and removal tool system according to claim 12, wherein the cap removal tool comprises a handle portion protruding from the removal tool body.

* * * * *